US012692157B2

(12) United States Patent
Blake et al.

(10) Patent No.: US 12,692,157 B2
(45) Date of Patent: Jul. 28, 2026

(54) PHOSPHORUS PRODUCTION METHODS AND SYSTEMS AND METHODS FOR PRODUCING A REDUCTION PRODUCT

(71) Applicant: Novaphos Phosphate Technology LLC, Fort Meade, FL (US)

(72) Inventors: David B. Blake, Lakeland, FL (US);
Lynnae L. Blake, Lakeland, FL (US);
Mark Vignovic, Lakeland, FL (US)

(73) Assignee: Novaphos Phosphate Technology LLC, Fort Meade, FL (US)

( * ) Notice: Subject to any disclaimer, the term of this patent is extended or adjusted under 35 U.S.C. 154(b) by 0 days.

(21) Appl. No.: 18/511,826

(22) Filed: Nov. 16, 2023

(65) Prior Publication Data

US 2024/0083749 A1     Mar. 14, 2024

Related U.S. Application Data

(62) Division of application No. 16/914,182, filed on Jun. 26, 2020, now Pat. No. 11,858,811.

(Continued)

(51) Int. Cl.
| | |
|---|---|
| *C01B 25/01* | (2006.01) |
| *C01B 25/00* | (2006.01) |
| *C01B 25/02* | (2006.01) |

(52) U.S. Cl.
CPC ............ *C01B 25/01* (2013.01); *C01B 25/003* (2013.01); *C01B 25/02* (2013.01)

(58) Field of Classification Search
CPC ........ C01B 25/01; C01B 25/003; C01B 25/02
See application file for complete search history.

(56) References Cited

U.S. PATENT DOCUMENTS

| | | | |
|---|---|---|---|
| 2,075,212 A | 3/1937 | Levermore et al. | |
| 3,235,330 A | 2/1966 | Lapple | |

(Continued)

FOREIGN PATENT DOCUMENTS

| | | |
|---|---|---|
| CN | 88101735 A | 10/1988 |
| CN | 1044077 | 7/1990 |

(Continued)

OTHER PUBLICATIONS

Machine translation of CN-106698370-A (Year: 2017).*

(Continued)

*Primary Examiner* — Anthony J Zimmer
*Assistant Examiner* — Logan Edward Laclair
(74) *Attorney, Agent, or Firm* — Randall Danskin, PS

(57) ABSTRACT

A phosphorus production method can include reducing feed containing phosphate ore and providing a silica ratio from 0.3 to 0.7 in a reaction chamber from 1250 to 1380° C. Less than 20% of the phosphate remains in the residue. Another phosphorus production method includes continuously moving a reducing bed through the reaction chamber with the feed agglomerates substantially stable while in the reducing bed. Reaction chamber temperature can be from 1250 to 1380° C. A phosphorus production system includes a barrier wall segmenting the reaction chamber into a reduction zone differentiated from a preheat zone. The bed floor is configured to move continuously from the preheat zone to the reduction zone during operation. A method for producing a reduction product includes exothermically oxidizing reduction/oxidation products in the reaction chamber, thereby adding heat to the reducing bed from the freeboard as a second heat source.

26 Claims, 8 Drawing Sheets

Related U.S. Application Data

(60) Provisional application No. 63/006,637, filed on Apr. 7, 2020, provisional application No. 62/905,749, filed on Sep. 25, 2019, provisional application No. 62/868,919, filed on Jun. 30, 2019.

(56) References Cited

U.S. PATENT DOCUMENTS

| | | | |
|---|---|---|---|
| 3,241,917 A | 3/1966 | Lapple | |
| 3,341,289 A | 9/1967 | Hendrickson | |
| 3,558,114 A | 1/1971 | Saeman | |
| 3,591,336 A | 7/1971 | Saeman | |
| 3,598,315 A | 8/1971 | Seymour | |
| 3,760,048 A | 9/1973 | Sullivan et al. | |
| 3,923,961 A | 12/1975 | Dancy | |
| 4,014,682 A | 3/1977 | Majewski | |
| 4,263,262 A | 4/1981 | Jukkola | |
| 4,321,238 A | 3/1982 | Henin | |
| 4,351,809 A * | 9/1982 | Megy | C01B 25/027 |
| | | | 423/323 |
| 4,351,813 A | 9/1982 | Megy et al. | |
| 4,372,929 A | 2/1983 | Barber | |
| 4,383,847 A | 5/1983 | Barber | |
| 4,389,384 A | 6/1983 | Hard | |
| 4,397,826 A | 8/1983 | Hard et al. | |
| 4,420,466 A | 12/1983 | Park et al. | |
| 4,421,521 A | 12/1983 | Barber | |
| 4,451,277 A | 5/1984 | Barber | |
| 4,514,366 A | 4/1985 | Barber | |
| 4,537,615 A | 8/1985 | Barber | |
| 4,603,039 A | 7/1986 | Kuxdorf et al. | |
| 4,608,241 A | 8/1986 | Barber | |
| 4,649,035 A | 3/1987 | Barber | |
| 4,656,020 A | 4/1987 | Megy | |
| 4,774,064 A | 9/1988 | Arnold et al. | |
| 4,919,906 A | 4/1990 | Barber | |
| 5,100,314 A | 3/1992 | Rierson | |
| 5,186,741 A | 2/1993 | Kotraba | |
| 5,228,895 A | 7/1993 | Kelly et al. | |
| 5,572,938 A | 11/1996 | Leger | |
| 5,743,934 A | 4/1998 | Wommack et al. | |
| 5,989,019 A * | 11/1999 | Nishimura | C21B 13/105 |
| | | | 75/484 |
| 6,296,479 B1 | 10/2001 | Nishimura | |
| 6,342,089 B1 | 1/2002 | McGaa | |
| 6,921,520 B2 | 7/2005 | Barber | |
| 6,932,002 B2 | 8/2005 | May et al. | |
| 7,378,070 B2 | 5/2008 | Megy | |
| 7,910,080 B2 | 3/2011 | Megy | |
| 8,734,749 B2 | 5/2014 | Megy | |
| 9,783,419 B2 | 10/2017 | Blake et al. | |
| 2004/0067187 A1 | 4/2004 | Barber | |
| 2004/0109809 A1 | 6/2004 | Hokanson et al. | |
| 2005/0002845 A1 | 1/2005 | Hokanson et al. | |
| 2007/0253882 A1 | 11/2007 | Megy | |
| 2008/0289385 A1 | 11/2008 | Megy | |
| 2010/0031776 A1 * | 2/2010 | Englund | C21B 13/105 |
| | | | 266/175 |
| 2013/0136682 A1 | 5/2013 | Megy | |
| 2016/0090305 A1 | 3/2016 | Blake | |
| 2016/0152473 A1 | 6/2016 | Hou | |
| 2019/0292055 A1 | 9/2019 | Blake et al. | |

FOREIGN PATENT DOCUMENTS

| | | | |
|---|---|---|---|
| CN | 1562847 | | 1/2005 |
| CN | 1837129 | | 9/2006 |
| CN | 101172587 A | | 5/2008 |
| CN | 101172588 A | | 5/2008 |
| CN | 102634621 A | | 8/2012 |
| CN | 106185851 A | * | 12/2016 |
| CN | 106698370 A | * | 5/2017 |
| CN | 107108211 A | | 8/2017 |
| CN | 206384844 | | 8/2017 |
| EP | 284233 A1 | | 9/1988 |
| FR | 826720 A | | 4/1938 |
| JP | 2185930 | | 7/1990 |
| SU | 976245 | | 11/1982 |
| SU | 1370073 | | 1/1988 |
| WO | 2001073137 A2 | | 10/2001 |
| WO | WO2004052938 | | 6/2004 |
| WO | WO2005118468 | | 6/2005 |
| WO | WO2008043222 | | 4/2008 |
| WO | WO2008153521 | | 12/2008 |

OTHER PUBLICATIONS

Machine translation of CN-106185851-A (Year: 2016).*

Yang, Shimo, "Development Trend of Phosphorous Production Technologies," Inorganic Salt Industry, Aug. 29, 1985, pp. 6-9, Iss. 8, China.

Kawatra, S.K., et al., "Novel Binders and Methods for Agglomeration of Ore," Apr. 2004, 29 pp., Michigan Tech. Univ., Dept. of Chem. Eng.

Megy, Joseph, "Revitalizing the Central Florida Phosphate Industry: A Case Study of Potential Value Addition Enabled by New Technology," JDCPhosphate Newsletter, Winter 2011, 5 pp., vol. 1, Iss. 1.

International Preliminary Report on Patentability, PCT/US2020/040191, Oct. 28, 2021.

Yamada, Alan, "Dust Suppressants For Temporary Helicopter Landing Areas," Aviation Management Tech Tips, Dec. 1998, 4 pp, US Dept. of Agriculture Forest Service.

Qiu, Liyou, et al, "Study on operation temperature range of the rotary kiln in KPA process" Abstract of Huaxue Fanying Gongcheng Yu Gongyi, 11(2), 203-7 (Chinese), 1995, Chem. Abst., 1997, 1 p., 123:203622.

Qiu, Liyou et al, "Study on kiln gas production in a rotary kiln for the KPA process" Abstract of Huaxue Fanying Gongcheng Yu Gongyi, 9(1), 90-7 (Chinese), 1993, Chem. Abst., 1997, 1 p., 120:110744.

Megy, Joseph A., "Rotary kiln process for phosphoric acid manufacture" Abstract of WO 2005118468 A2 pub. Dec. 15, 2005, Chem. Abst. 2007, 1 p., 144:24490.

Jacob, K.D., et al., "Reduction of Tricalcium Phosphate by Carbon, Effect of Silica and Alumina on the Reaction," Ind. and Eng. Chem., Nov. 1929, pp. 1126-1132, vol. 21, No. 11.

Misao, Masahiro, et al., "Reduction of ore pellets in rotary kiln" Abstract of JP 02185930 A2 pub. Jul. 20, 1990, Chem. Abstr., 1997, 1 p., 114:251117.

Mu, Jacob, et al. "Reduction of Phosphate Ores by Carbon: Part 1, Process Variables for Design of Rotary Kiln System," Metallurgical Transactions B, Dec. 1986, pp. 861-868, vol. 17B.

Yang, Shimo, "Production of phosphoric acid by combustion of lean phosphorus mud in rotary kiln" Abstract of CN 85104782 A pub. Dec. 10, 1986, Chem. Abst., 1997, 1 p., 108:8278.

Ni, Tianyin, et al, "Preparation of High-Concentration Phosphoric Acid by Direct Reduction of Midlle/Low Grade Phosphorite" Abstract of CN 101125646 A pub. Feb. 20, 2008, Chem. Abst., 2008, 1 p., 148:358299.

Green, Don W., et al, Perry's Chemical Engineers' Handbook, Sixth Edition, 1984, pp. 19-35 through 19-40, McGraw-Hill Book Company.

Zhantasov, K.T., et al, "Pelletization of Phosphate-siliceous ore fines in a rotary kiln" Abstract of Kompleksn. Ispol'z. Miner. Syr'ya, (11), 27-30 (Russian) 1987, Chem. Abst., 1997, 1 p., 108:97143.

Sarna, Satyendra K., "Fastmet and Fastmelt Processes of Ironmaking," Nov. 15, 2013, 5 pp., https://www.ispatguru.com/fastmet-and-fastmelt-processes-of-ironmaking/, Accessed Jun. 6, 2020.

Leder, Frederic, et al., "New Process for Technical-Grade Phosphoric Acid," Ind. Eng. Chem. Process Des. Dev., 1985, pp. 688-697, vol. 24, No. 3.

Zhang, Dingbin, et al, "Industrial vertical flame-isolating kiln for preparing yellow phosphorus or phosphoric acid from phosphorus ores" Abstract of CN 101298959 A pub. Nov. 5, 2008, Chem. Abst., 2008, 1 p., 149:536540.

(56)            References Cited

OTHER PUBLICATIONS

Rierson, David W., "Illmenite Direct Reduction Project in Norway Using the GRATE-CAR (TM) Process," AIME Conference, 1992, 6 pp., Allis Mineral Systems, Pyro Systems Division.

Paul, Christopher A., et al, "Desulfurization of Petroleum Coke Beyond 1600 C," Light Metals 2001, 2001, 4 pp., The Minerals, Metals & Materials Society.

Zhang, Dingbin, et al, "A method for manufacturing phosphoric acid and construction bricks from phosphorus-containing tailings obtained in phosphorite benefication" Abstact of CN 1837129 A, Sep. 27, 2006, Chem. Abst., 2007, 1 p., 145:424251.

Sarna, Satyendra K., "Ironmaking in Rotary Hearth Furnace," May 17, 2017, 11 pp., https://www.ispatguru.com/ironmaking-in-rotary-hearth-furnace/, Accessed Jun. 4, 2020.

Sarna, Satyendra K., "ITmk 3 Process of making Iron Nuggets," Feb. 17, 2013, 9 pp., https://www.ispatguru.com/itmk-3-process-of-making-iron-nuggets/, Accessed Jun. 6, 2020.

Tanaka, Hidetoshi, et al, "FASTMET (R), FASTMELT (R), and ITmk3 (R): Development of New Coal-based Ironmaking Processes," RHF Technologies 2007/2008, pp. 8-13, Direct From Midrex.

* cited by examiner

PHOSPHORUS PRODUCTION METHODS AND SYSTEMS AND METHODS FOR PRODUCING A REDUCTION PRODUCT

CROSS REFERENCE TO RELATED APPLICATIONS

This application is a divisional under 35 U.S.C. § 120 of U.S. patent application Ser. No. 16/914,182, filed on Jun. 26, 2020 and entitled "Phosphorus Production Methods and Systems and Methods for Producing a Reduction Product," which claims the benefit under 35 U.S.C. § 119 of U.S. Provisional Pat. App. No. 62/868,919, filed on Jun. 30, 2019 and entitled "Phosphorus Pentoxide Production Methods and Systems with Increased Yield", of U.S. Provisional Pat. App. No. 62/905,749, filed on Sep. 25, 2019 and entitled "Phosphorus Pentoxide Production Methods and Systems with a Rotary Hearth Furnace", and of U.S. Provisional Pat. App. No. 63/006,637, filed on Apr. 7, 2020 and entitled "Phosphorus Production Methods, Systems, and Compositions; Energy Reduction Methods; and Supplementary Cementitious Material", each of which is incorporated herein by reference.

BACKGROUND

Phosphorus pentoxide has the molecular formula $P_4O_{10}$, usually present in the gas phase, but is commonly represented by its empirical formula, $P_2O_5$, from which phosphorus pentoxide derives its name. One known method for producing phosphorus pentoxide involves processing agglomerates, such as pellets or balls, containing phosphate ore, silica, and coke on the bed floor of a rotary kiln. The processing chemically reduces the phosphate ore and generates gaseous phosphorus (often $P$, $P_2$, or $P_4$) and carbon monoxide (CO) off gas to the kiln freeboard where they are burned (oxidized) with air to provide heat for the process. It may be referred to as the kiln phosphoric acid (KPA) process. The oxidized phosphorus (normally, phosphorus pentoxide) can be scrubbed from the kiln off gases with a phosphoric acid ($H_3PO_4$) solution and water to make a suitable phosphoric acid product.

From a theoretical viewpoint, KPA processing has been a long-preferred process for the recovery of phosphorus from ore due to its energy efficiency and high throughput capability. Despite promising yields and economics, the KPA, process has not been utilized commercially due to low actual yields. US App. Pub. No. 2019/0292055 also describes unexpected costs encountered at a demonstration-scale plant.

The Improved Hard Process (IHP) described in U.S. Pat. Nos. 7,378,070 and 7,910,080 provided several advancements to the KPA process. U.S. Pat. Nos. 8,734,749 and 9,783,419 and US App. Pub. No. 2019/0292055 additionally describe methods and systems related to the IHP for the reduction and recovery of phosphorus from apatite. The pertinent and supportive teachings of each of these five patent documents are incorporated herein by reference. Despite the advancements, implementation of the IHP revealed that new methods and systems for production of phosphorus by carbo-thermal reduction may be beneficial, for example, to increase yield.

SUMMARY

A phosphorus production method includes forming a reducing bed containing feed agglomerates in a reaction chamber by heating the feed agglomerates. The feed agglomerates include a core initially containing phosphate ore and carbonaceous material, the core initially providing a formula weight ratio of silicon dioxide to calcium oxide plus magnesium oxide ranging from 0.3 to 0.7. The method can include maintaining a temperature in the reaction chamber from 1250 to 1380° C. along at least a portion of the reducing bed. Off gas is generated from the reaction chamber, the off gas containing phosphorus in the form of elemental phosphorus and/or phosphorus pentoxide. The method can include collecting phosphorus from the off gas and removing from the reaction chamber a residue containing processed agglomerates, less than 20% of the phosphate initially in the feed agglomerates remaining in the residue.

Another phosphorus production method includes forming a reducing bed containing feed agglomerates in a reaction chamber by heating the feed agglomerates. The feed agglomerates include a core initially containing phosphate ore and carbonaceous material. The method includes continuously moving the reducing bed through the reaction chamber with the feed agglomerates substantially stable while in the reducing bed. A temperature can be maintained in the reaction chamber from 1250 to 1380° C. along at least a portion of the reducing bed. Off gas is generated from the reaction chamber, the off gas containing phosphorus in the form of elemental phosphorus and/or phosphorus pentoxide. The method includes collecting phosphorus from the off gas and removing from the reaction chamber a residue containing processed agglomerates.

A phosphorus production system includes a reaction chamber, a barrier wall segmenting the reaction chamber into a reduction zone differentiated from a preheat zone, and a bed floor at a bottom of the reaction chamber. The bed floor is configured to move continuously from the preheat zone to the reduction zone during operation while keeping feed agglomerates thereon substantially stable at least while in the reduction zone. The system includes one or more direct-fired burners in the reduction zone, but not in the preheat zone, and one or more over-bed air and/or oxygen ports above the bed floor in the reduction zone, but not in the preheat zone. One or more indirect heating sources are in the preheat zone.

A phosphate ore feed agglomerate includes a core containing phosphate ore and carbonaceous material. The core can provide a formula weight ratio of silicon dioxide to calcium oxide plus magnesium oxide ranging from 0.3 to 0.7 and a phosphate content of greater than 13 weight % as $P_2O_5$.

A method for producing a reduction product includes forming a reducing bed containing feed agglomerates in a reaction chamber by heating the feed agglomerates. The feed agglomerates include a core initially containing an oxidizing agent and a reducing agent. The method includes continuously moving the reducing bed through the reaction chamber with the feed agglomerates substantially stable while in the reducing bed. A temperature is maintained in the reaction chamber along at least a portion of the reducing bed partly by adding heat from a first heat source. Gaseous products are generated that enter a freeboard over the reducing bed from a reduction-oxidation reaction occurring in the reducing bed, the gaseous products containing a reduction product from reduction of the oxidizing agent and an incompletely oxidized oxidation product from oxidation of the reducing agent. The method includes exothermically oxidizing the reduction product in the freeboard while still in the reaction chamber and exothermically further oxidizing the incompletely oxidized oxidation product in the freeboard while still in the reaction chamber, thereby adding heat to the reducing bed from the freeboard as a second heat source to reach the temperature in the reaction chamber. The method includes collecting oxidized reduction product and/or remaining, unoxidized reduction product, if any, from the off gas and removing from the reaction chamber a residue containing processed agglomerates.

A supplementary cementitious material (SCM), includes a flowable particulate material containing phosphate ore residue and calcium silicate and exhibiting pozzolanic properties suitable for SCM.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1:
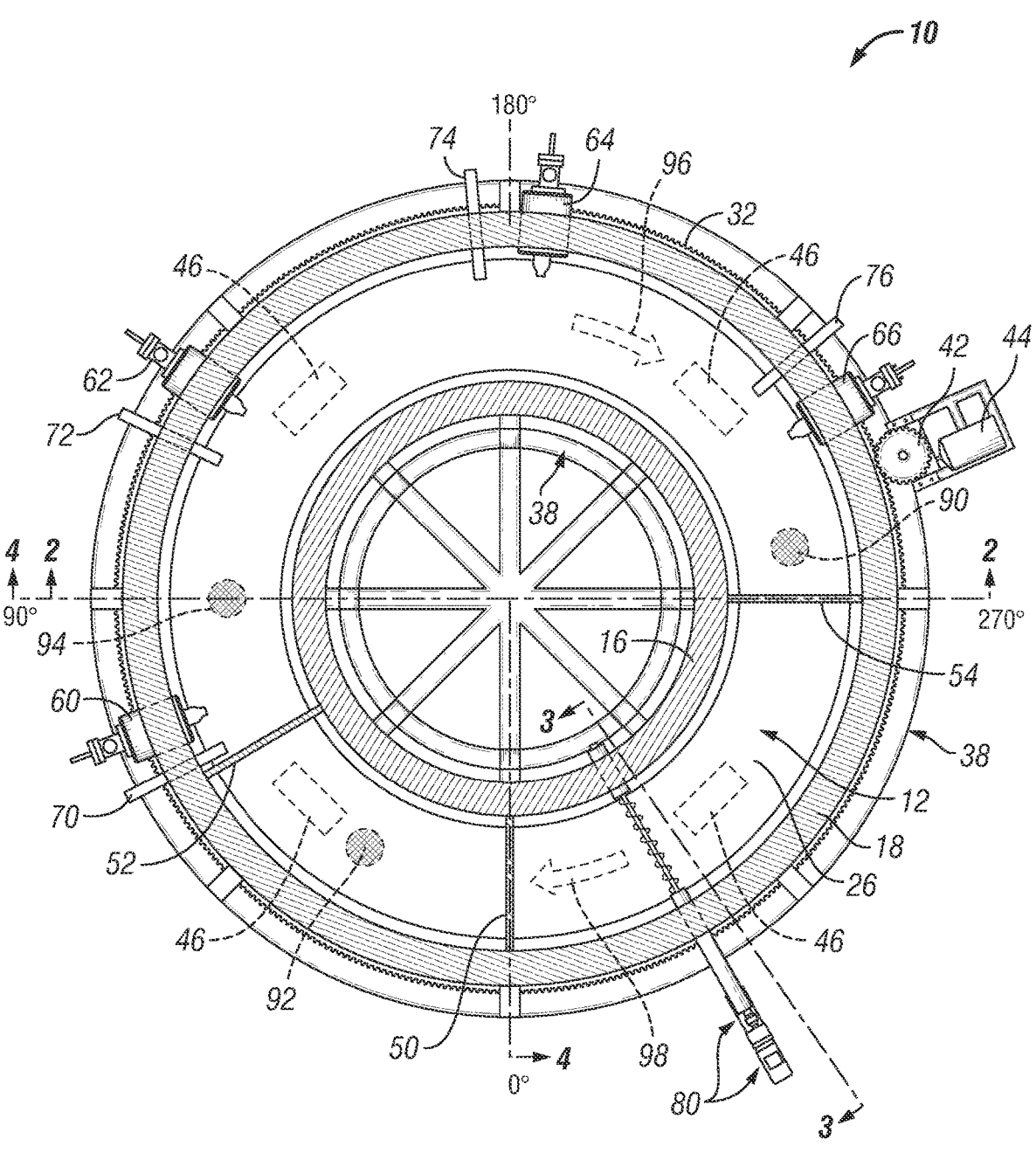
FIG. 1 is a top sectional view of a rotary hearth furnace (RHF) taken along line 1-1 shown in FIG. 2.

One area of discovery described herein regards the use of reaction chambers, such as reaction chambers with a hearth-like bed floor and reaction chambers found in rotary hearth furnaces (RHFs), rotary kilns, tunnel kilns, etc., for the reduction and recovery of elements from an oxidized state. For example, phosphorus may be recovered from apatite and other phosphate-bearing materials to produce phosphoric acid and/or elemental phosphorus, as well as supplementary cementitious material and/or lightweight aggregate. Also, for example, the reaction chambers may operate at temperatures from 1180° C. to less than 1400° C., such as from 1225 to less than 1400° C., including 1225 to 1380° C., 1250 to 1380° C., and 1250 to 1350° C. The various methods, systems, and compositions described individually herein may be implemented alone or in combination.

A reaction chamber provides an enclosed space where process conditions may be controlled and process off gases collected. In reaction chambers within a hearth-like bed floor, the carbo-thermal reduction reaction of phosphate may occur as a continuous process and may allow for increased phosphate yields while reducing negative impacts of dust. The phosphorus collected from the off gas may be oxidized in a thermal oxidizer, as described further below. The processed agglomerates may be a co-product, as described further below, suitable for several construction applications, including use as a lightweight aggregate (whole agglomerate) or supplementary cementitious material (such as when subsequently ground to less than 45 micrometers (μm)).

Aside from the silica ratio in the process feed, compositions for feed agglomerates that are generally known may be used in the methods herein in accordance with known considerations for selecting such compositions. The known improved hard process (IHP) is based on maintaining a certain silica ratio to decrease melting in the solids at operating temperatures. The silica ratio (SR) herein refers to the formula weight ratio of silicon dioxide to calcium oxide plus magnesium oxide or (% $SiO_2$/60)/((% CaO/56)+(% MgO/40.3)). According to the IHP, SR should be maintained around 2.0 to avoid the eutectic point at which slag and some calcium silicates liquefy. The known IHP uses a ported rotary kiln as the means to provide the energy and temperature for the reduction reaction that drives off the phosphorus. Melting in this vessel may lead to very difficult operating conditions as cold agglomerates from the feed end run into and stick to melted material in the hot end of the kiln. This forms large lumps, or clinkers, which may be difficult to remove and may further deteriorate the integrity of the kiln bed containing the agglomerates. Usually, no amount of melting can be tolerated in a rotary kiln.

Some of the methods herein use a much lower silica ratio mix that is on the other side of the eutectic point on the phase diagram. The eutectic point starts at around 0.67 SR and ends at around 1.5. Ratios below 0.67 and above 1.6 can allow temperatures to be hotter in the system to initiate reduction without melting. A ratio of 1.6 often does not allow temperatures high enough for reduction to occur, which is the reason for the ratio of 2.0 in the IHP.

As demonstrated herein, silica ratios of around 0.5, such as 0.3 to 0.7, can be used that produce reduction yields of 90% or higher without significant melting and at temperatures just above 1250° C. There may be a small amount of melting that occurs at the 0.3 to 0.7 ratio. Generally, it is a very viscous melt that is not flowable, though it may stick to the other agglomerates. In nearly all cases, even small amounts of melting and stickiness can be undesirable in a rotary kiln.

An RHF offers a bed floor that keeps agglomerates substantially stable, that is, stationary with respect to each other, while continuously moving under a heat source. A "substantially" stable bed permits some settling or incidental shifting in relative position among the agglomerates while the bed floor continuously moves, but does not intentionally tumble, blend, or similarly disturb the bed. A small amount of melting may be acceptable in this system without the deleterious effect observed in rotary kilns. As a precedent, iron ore systems using RHFs allow their agglomerates to melt to increase yield and throughputs.

Accordingly, in phosphorus production, operating temperature may be 1250 to 1380° C., including 1250 to 1350° C., and silica ratio may be 0.7 to 0.3, with the lower silica ratio corresponding to the higher temperature and the higher silica ratio corresponding to the lower temperature, for yields of greater than 80%, such as greater than 85%, including greater than 93%. Residence times with less than 60 minutes of heating at the target temperature, such as 30 to less than 60 minutes, including 30-45 minutes, may be sufficient to achieve the stated yields within the ranges of silica ratio and temperature. Test data below describe results in the indicated ranges. Though well-suited to an RHF, such process conditions could be used in other reaction chambers with a hearth-like bed floor or tunnel kilns with a beneficial result. A rotary kiln might even be suitable, assuming the melting can be tolerated or controlled by some means other than a high silica ratio above 1.6.

One benefit of using a lower silica ratio includes increased phosphorus throughputs per unit ton of feed material. For example, in one high silica ratio mix with a silica ratio of 2.5, phosphate (as $P_2O_5$) levels are 11-13 weight percent (wt %), depending on other impurities. In a comparable, lower silica ratio mix in which only the silica ratio is changed to 0.5, $P_2O_5$ levels are 17-20 wt %. This increases throughput or $P_2O_5$ extraction potential from 9% up to 17%, for example, nearly doubling potential $P_2O_5$ extraction. Often, producing a mix for feed agglomerates with a high silica ratio, such as above 1.6, includes adding supplemental silica to the mix of phosphate ore and carbonaceous material in addition to silica already in the phosphate ore. To produce a lower silica ratio mix, the amount of supplemental silica may be left out or at least decreased. Less supplemental silica then allows more concentrated phosphate to be contained in the agglomerate mix.

Summarizing the description above, tradeoffs exist between choosing to operate at SR 0.3 compared to SR 0.7. At the lower SR 0.3, the melting risk is lower and the $P_2O_5$ levels are higher, but the yield at lower temperatures is lower. At the higher SR 0.7, the yield at low temperatures is higher, but the melting risk is higher and the $P_2O_5$ levels are lower. Table 1 highlights the tradeoffs. The description above describes the benefits of operating at SR 0.3 to 0.7 compared to a silica ratio on the other side of the eutectic higher than 1.6, such as 2.0. Even so, the methods, systems, and compositions herein may relieve some of the disadvantages of SR higher than 1.6, as demonstrated with pilot-scale testing at SR 2.0 and higher described below. Table 1 also highlights tradeoffs for silica ratios higher than 1.6.

TABLE 1

| Consideration | SR 0.3 | SR 0.4 to SR 0.6 | SR 0.7 |
|---|---|---|---|
| Yield at lower temperatures | Lower | --------------------» | Higher |
| Melting risk | Lower | --------------------» | Higher |
| $P_2O_5$ in feed | Higher | «-------------------- | Lower |

| | SR > 1.6 | SR 1.7 to SR 1.9 | SR 2.0 and higher |
|---|---|---|---|
| Yield at lower temperatures | Lower | --------------------» | Higher |
| Melting risk | Higher | «-------------------- | Lower |
| $P_2O_5$ in feed | Higher | «-------------------- | Lower |

One example of a suitable RHF includes a rotating annular hearth surrounded by a stationary reaction chamber. The reaction chamber may be heated and maintained up to 1380° C. by indirect heaters and/or by the direct combustion of fuel gas, natural gas, or fuel oil, to which may be added port air or oxygen-enriched combustion air, injected through the furnace roof and/or walls. Indirect heaters provide heat transfer without relying on a direct flame or exhaust from combustion. Post-combustion of carbon monoxide gas from a bed of agglomerates may further heat the reaction chamber. Radiation is the main mode of heat transfer in an RHF from the gas and furnace walls to the agglomerate bed. The secondary heat transfer mechanisms are convection from the gas and conduction from the floor.

RHFs are used to reduce iron oxide into pig iron or pure iron. Similar to IHP, iron ore solids are ground and mixed with reductant carbon. This mix is agglomerated and layered onto the hearth where radiative heat allows for the carbon to reduce the oxide. However, the iron product is in the solids discharged from the hearth, while the phosphorus product from IHP is in the off gas. The literature describes direct reduced iron (DRI) produced by RHF and both DRI and zinc oxide produced by RHF.

An RHF may have reduction temperatures and times similar to a ported rotary kiln. Off gases could be collected with a phosphoric acid scrubbing system in a similar manner to a kiln process off gas, or other known scrubbing systems. The IHP is based on the use of the ported rotary kiln. Operational issues have occurred with ported rotary kilns, including dust generation from the tumbling action of the bed and lower yields due to exposure of the entire bed to oxidizing gases, such as $O_2$ and $CO_2$ at low bed temperatures during the slow ramp up of bed temperature. Oxidizing gases burn with the carbon required for the reaction and could also change the agglomerate surface chemistry due to the premature loss of carbon, which would not allow gaseous phosphorus to escape the agglomerate. The gaseous phosphorus can react with calcium remaining on the ball surface to form calcium phosphates.

As a result, benefits A-D of the RHF over known rotary kilns and/or known tunnel kilns are listed below. Though listed as benefits of an RHF as an example, the additional descriptions below explain how these benefits may be extended to other systems, including systems using reaction chambers with a hearth-like bed floor.

A. No tumbling of the agglomerates while they rest on the hearth-like bed floor, which can generate dust and produce solid precipitates due to subsequent back reactions, as with agglomerates that tumble through a rotary kiln. These precipitates can shorten the life of the rotary kiln.

B. Increased phosphorus recovery and increased phosphate yield resulting from decreased exposure of feed agglomerate surface area to harmful oxidation reactions from freeboard gas. This may be achieved through one or more methods including indirect heating, use of a stable bed, fast ramp up to reduction temperature (i.e., decreased heating times), and the use of protective layering in the agglomerate bed. The setup, operation, feed, discharge, and materials of construction of an RHF are better suited for these methods than both a known rotary kiln and a known tunnel kiln.

C. Potential to allow feed agglomerates to melt without harmful effects on hearth.

D. Downstream phosphoric acid recovery plant for an indirectly-heated RHF can be smaller than a direct fired known rotary kiln or known tunnel kiln for the same amount of materials processed and the same amount of acid production. As explained below, limitations on indirect heating exist in rotary kilns such that an indirectly-heated kiln cannot attain the level of heat transfer found in a directly-heated kiln.

Similar benefits may potentially be obtained from use of, or be designed into, systems other than RHFs that include reaction chambers with a hearth-like bed floor.

Benefit A: Dusting

A rotary kiln operates at an incline with a component of vertical rotation by which it constantly tumbles the feed bed as the means to transport the material from feed end to discharge. The tumbling action creates dust due to attrition of the agglomerate surface. Some of this dust is swept into the feed bed and the freeboard of the kiln, where it can then react with other components and precipitate on colder sections of the kiln, mainly near the solid feed end where the gas is discharged. Some calcium phosphates produced on the agglomerate surface can also dust-off, start to melt in the hot area of the kiln, and then re-precipitate in the cooler sections. These precipitates eventually start to block the air flow, resulting in a need to shut the kiln down and clean out the solids.

It has been demonstrated (see, U.S. Pat. No. 9,783,419) that a separate induration kiln (preceding the reduction kiln) effectively heat hardens the feed agglomerates to significantly decrease agglomerate dusting and breakage. But, the rotary tumbling action may still result in dust due to attrition in the reduction kiln. In addition, dust generated in the induration kiln may carry over on the surface of the heat hardened agglomerates fed to the reduction kiln. A dust loss of 0.1% from the feed agglomerates that is discharged to the freeboard can be enough to result in kiln rings and solids buildup. Also, combustion and/or port air can react with gaseous phosphorus, such as P, $P_2$, or $P_4$ (referred to herein as "gaseous P"), to create more $P_4O_{10}$ in the freeboard, which readily reacts with the incoming dust to create calcium phosphates responsible for buildups and rings in the kiln.

An RHF may be the means to impart sufficient energy for the carbo-thermal reduction reaction. The RHF does not tumble the bed as a means of continuous feed and transport to a hot zone, where exposure to temperatures sufficient for reduction occurs, as in a rotary kiln. In an RHF, the bed is established on the hearth table via continuous feed and remains stable while it is transported mechanically via rotation in a horizontal plane under stationary heating sources, whether direct fired, indirect fired, or electric. As a result, dust formation may greatly decrease. The residual dust carried over from previous operational steps (dryer, conveyor, etc.) will likely stay in the bed as the bed is not turning over into an air-swept freeboard like in the kiln.

In addition, it is possible for port air not to be added into the reaction chamber itself, but to the RHF exhaust gases by way of an afterburner in a secondary processing step. Thus, $P_4O_{10}$ formation diminishes within the reaction chamber, beneficially decreasing dust and free board component reactions that contribute to build-up. Adding port air to a rotary kiln's off gas by way of an afterburner is not as effective due to excess dust in the off gas and the likelihood of buildups and rings in the afterburner. The RHF may also be designed with more uniform temperature zones, which impede formation of cooler spots, regions, and other potential areas for solids precipitation to occur.

An RHF is one type of reaction chamber with a hearth-like bed floor. Other reaction chambers with hearth-like bed floors might be used successfully in the methods and systems herein. A hearth-like bed floor does not intentionally tumble the bed. A reaction chamber with a hearth-like bed floor may provide continuous transport of agglomerates through the hot zone, where exposure to temperatures sufficient for reduction occurs. In contrast to continuous transport of agglomerates through the hot zone, batch transport would involve loading agglomerates onto a hearth-like bed floor in a reaction chamber and holding the bed floor stationary in the hot zone for carbo-thermal reduction. There would also be a loss of heat on the bed floor while loading and unloading the bed between batches.

Benefit B: Decreasing Oxidizing Freeboard Gases to Increase Phosphorus Recovery and Phosphate Yield Phosphate yield indicates the amount of phosphate initially in feed agglomerates that does not remain in the residue containing processed agglomerates. Phosphorus recovery indicates the amount of phosphorous initially in feed agglomerates that is collected, usually as phosphoric acid, but possibly as elemental phosphorous. Phosphate yields and phosphorous recovery can be negatively impacted by insufficient available energy or temperature to start the carbo-thermal reduction reaction or by insufficient carbon to complete the reaction.

Reducing conditions in the kiln atmosphere or kiln freeboard insufficient to suppress the formation of calcium phosphates on the agglomerate surface can also negatively impact yield. Overall, under known ported rotary kiln conditions, actual phosphate yields are approximately 60%, often with a maximum of 70%. Under oxidative conditions, some of the gaseous P released from the carbo-thermal reduction of apatite reacts with calcium on the outer layer of the agglomerates to create a "white shell" that not only continues to build, but also restricts complete evolution of gaseous P, thus limiting overall phosphate extraction and yields. Depending on the oxidative conditions, the $P_2O_5$ concentration in the white shell may be higher than that of the original feed. Also, the mass of the shell may be up to 50% of the total mass of the reduced agglomerate due to its higher density as compared to the inner core. In some agglomerates, the outer, white shell is quite differentiated from the core and from a transition layer between the core and the white shell and is about 0.5-1.0 millimeter thick.

Recent testing and analysis identified the main components of the white shell, its mechanism of formation, and the atmospheric reducing conditions that diminish the white shell formation. Spent agglomerates from a pilot-scale, ported rotary kiln process underwent SEM/EDS and XRD laboratory analysis, revealing that the white shell contained a calcium phosphate mineral, Whitlockite [$(Ca_9(Mg,Fe)(PO_4)_6PO_3OH)$] along with a hydrated alumino-calcium silicate (Levyne) and Fluorapatite [$(Ca_5(PO_4)_3F)$]. The concentration of phosphorus is higher in these compounds than in the original apatite, indicating that a secondary, calcium-based reaction produced the white shell, rather than unreacted apatite.

Besides the white shell, the discharged kiln pellet had an inner dark core comprised of predominantly quartz (natural) and silicon oxide (artificial due to heating) and a calcium alumino-silicate (Anorthite family) $(Ca_{0.5}((Al_{0.1}Si_{1.9})O_4)$. There was less than 1% phosphate in the inner core of the reduced pellet that was discharged from the kiln. The low phosphate content in the inner core confirmed there was sufficient time, temperature, and carbon content available for near complete reactions with 90% or higher yields.

The loss of yield was believed due to the formation of calcium phosphates on the surface of the agglomerate, which was a function of the oxidative conditions in the freeboard of the kiln. A thermodynamic analysis of the operating conditions reveals the conditions that might lead to forming this white shell.

Figure 5:
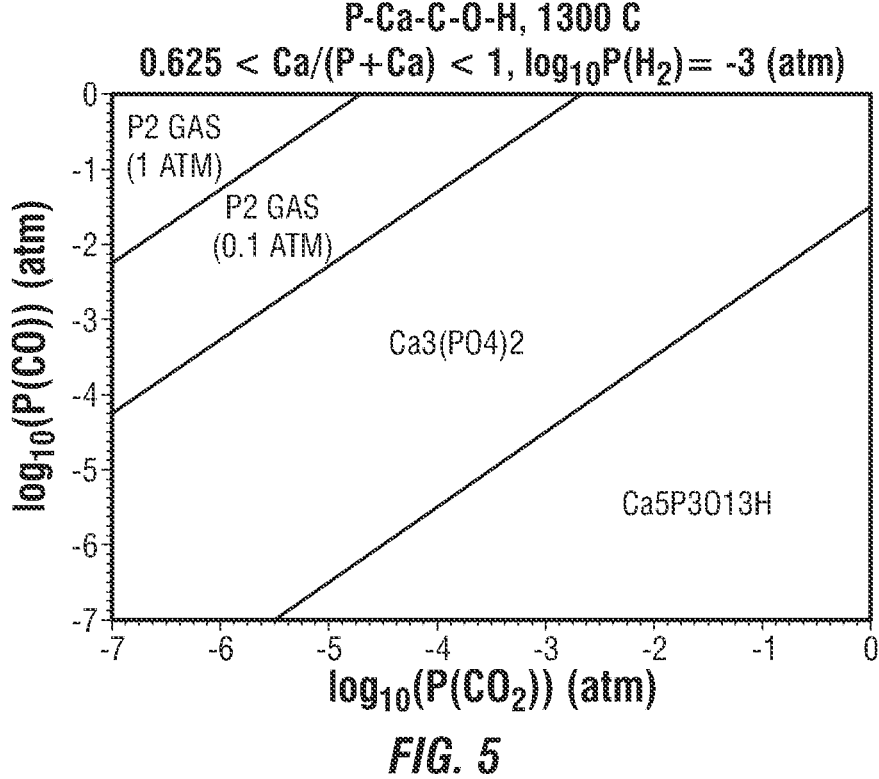
FIG. 5 is a predominance diagram for alkaline earth phosphates.

A predominance diagram (modified for simplicity) can help clarify the conditions for stability of different phases. From the diagram in FIG. 5, one can see that conditions to keep phosphorus from back reacting to form calcium phosphate are quite reducing. The lines for $P_2$ gas at 1 atm and 0.1 atm are given. These show that for the 0.1 atm $P_2$ line, CO concentrations need to be above about 1% (−2 on the log axis), but that $CO_2$ concentrations must be less than ~0.1%.

This indicates the degree of reduction that is required in a carbo-thermal reduction process for the production of phosphorus.

Figure 6:
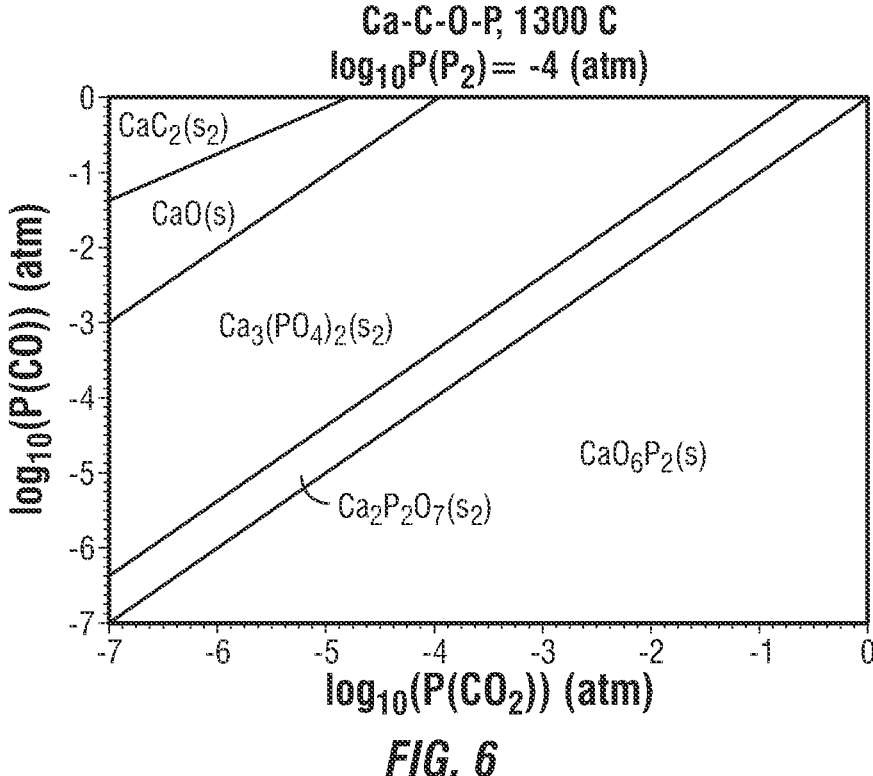
FIG. 6 is a predominance diagram for CaO interaction with phosphorus.

A second approach to the predominance diagram is only to look at calcium bearing phases to see when CaO is predominate and when calcium phosphate exists. This is shown in FIG. 6 where hydrogen has been removed from the conditions and the P in the gas is fixed. Changing the partial pressures of $P_2$ can impact the diagram slightly, but the purpose is to show where CaO can no longer form phosphates. It can be seen in FIG. 6 that a $CO/CO_2$ ratio of about 10,000 is needed to suppress CaO's ability to combine with phosphorus. This ratio is clearly much higher than the freeboard conditions in a direct fuel fired kiln due to air injection and subsequent formation of high concentrations of $CO_2$.

Based upon recent test work using various fixed $CO/CO_2$ atmospheres, there is strong evidence that the phosphorus is released from the pellet and recaptured from the bulk gas. It appears that once phosphorus has reacted on the surface, it remains there. This would indicate that the phosphorus transitions from a relatively reactive phase (apatite) to one that is more stable (Whitlockite). The mechanism of phosphorus retention appears to be due to the bulk gas phase being too oxidizing.

To control the negative yield impacts of the oxidative atmosphere in a rotary kiln, measures 1-4 could be attempted:

1. Use of indirect heating and no port air addition to diminish formation of $CO_2$;
2. Decrease bed surface area of the agglomerates exposed to the atmosphere;
3. Quicker ramp up times to reaction temperatures to evolve the gaseous P faster than the calcium phosphate formation; and/or
4. Addition of protective layer of carbon to keep localized $CO/CO_2$ levels high.

However, as discussed, ported rotary kilns are designed to use a single fuel-fired burner with a well-mixed bed that exposes surface area of the bed as it rotates under a slow ramp up of temperature. The rotation of the kiln also decreases effectiveness of a protective carbon layer. In comparison, an RHF may be designed to implement one or more of the four favorable measures listed above.

Measure 1: Indirect Heating Using Electric Heating Elements and/or Radiant Tube Burners. This diminishes the high $CO_2$ content from the direct combustion of natural gas, coal, or fuel oil that occurs in a rotary kiln. This is more easily accomplished in an RHF as multiple heating elements can be added along the perimeter of the hearth above a bed to create the desired heat. Radiant tube burners are indirect-fired heat sources using combustion to generate heat, but containing and venting exhaust. Combustion products do not come in contact with material to be heated. However, a rotating kiln bed limits the number of heating elements/indirect burners in a kiln since the installation is limited to the feed end of the kiln, which may also move the kiln hot spot away from the discharge end of the kiln and upset the counter-current flow of gas compared to solids. The elements/burners cannot be installed along the kiln shell and in the discharge hood (near the kiln hot spot) since the kiln's rotating bed is lifted and may fall damaging the elements/burners. The limited number of elements/burners in a rotary kiln cannot create the desired heat.

Measure 2: Bed Surface Area. Unlike the bed in a rotary kiln, the bed in an RHF is stable and mechanically rotated under the heat from the reaction chamber, thus, generally only exposing the top layer of the RHF bed to harmful oxidative atmospheres and not the entire bed, as in a ported rotary kiln.

Measure 3: Fast Ramp Up to Reduction Temperatures. In known rotary kilns or known tunnel kilns, feed material slowly moves down the length of the kiln, gradually heating up from the counter flow of hot freeboard gases as it approaches the one main hot spot closer to the burner flame tip near the bed discharge. This is fairly energy efficient, but the slower ramp up time while exposed to oxidative gases promotes premature burn of carbon in the bed and increases "white shell" formation before the reduction temperature is reached. An RHF has the ability to expose the bed to reaction temperatures directly, heating the bed up to reaction temperatures much faster. The entire RHF reaction chamber or a selected portion thereof may be controlled at reduction temperatures with multiple heating elements and/or burners located around the perimeter. The bed floor remains hot after the processed agglomerates are removed, which allows for the immediate heating of fresh agglomerates fed to the RHF.

A number of lab furnace tests demonstrated the potential positive benefits of direct exposure to high temperatures versus a slower ramp up. For both test cases, cold (ambient temperature) pellets were used. The temperatures shown in Table 2 below are lab furnace temperatures. The slow ramp test involved placing cold pellets in the lab furnace heated to 900° C. and increasing the furnace temperature from 900 to 1290° C. over 30 minutes to mimic heating of the pellets as they move down the length of a rotary kiln. For the direct exposure test, the lab furnace was already at 1290° C., the furnace door was opened, the cold pellets were placed in the lab furnace, and the door was closed to mimic the RHF. The temperature in the lab furnace returned to 1290° C. in 5 minutes. Both tests had a controlled atmosphere of approximately 12% $CO_2$ to simulate direct fired burner conditions and were held at the 1290° C. reaction temp for 15 minutes.

TABLE 2

| Test Results for Fast Ramp Up to Reduction Temperatures-Direct Heat vs. Slow Ramp Up | | |
|---|---|---|
| Non-protected green ball test 12% $CO_2$ | Slow ramp up (900° C. to 1290° C.) in 30 minutes | Direct exposure to 1290° C., fast ramp up in 5 minutes |
| Phosphate Yield | 55% | 88% |

The rotary kiln has a wider temperature profile from feed to discharge and takes about 30 minutes for the feed balls to get full exposure to the reduction temperature. An RHF can have even temperatures throughout, thus, the fresh feed is exposed to the reduction temperature quickly, for example, in less than 10 minutes. The 30 minute ramp up time in the rotary kiln is one of the root causes of carbon losses. It was also noted that the slow ramp up material, after reduction, had significantly higher amounts of the white shell, as discussed previously.

Measure 4: Layering or Coating to Protect Bed to Keep Oxidative Gases Away from the Feed Reactants. The RHF allows for the use of a protective layer, such as coke or a similar carbon source, to keep oxidative gases away from the feed reactants. Since the bed is stable in an RHF, a layer of coke can be added on top of the bed without disruption. In a rotary kiln, the bed constantly rotates, thus inhibiting carbon protection. Lab furnace tests were conducted under similar ramp up profile and reaction temperatures, with the difference being one set of feed pellets had a protective layer of petroleum coke to consume oxidative gases and one did not have a protective layer of petroleum coke. Even under unfavorable slow ramp up conditions, the protective coke layer provided significant yield benefits (more than 40% increase).

TABLE 3

Test Results for a Protective Layer of Pet Coke to
Provide Atmospheric Protection

| Green ball test | Non-protected, slow ramp up | Pet Coke layer on top, slow ramp up |
|---|---|---|
| Phosphate Yield | 25% | 67% |

If warranted, then additional carbon may be added to the feed to provide a protective coating on the agglomerates. A protective coating of carbon may include fine carbon particles added to the agglomerates prior to the RHF, but after the initial agglomerates are made. The carbon coating may be 1-3 wt % extra carbon and can provide protection from the oxidizing atmosphere. The coating thickness may be 0.5 to 0.7 mm. The RHF uniquely enables the effectiveness of this protective coating since the rotary kiln would tend to attrit off the protective coating as it tumbles.

Benefit C: Melting Capability

An RHF can operate with feed chemistries and furnace temperatures such that the bed starts to melt. Feed agglomerates with silica ratios less than 2.0 often melt at temperatures above 1250° C. If melting were allowed, then feed grades could be increased up to 80% (10% $P_2O_5$ to 18% $P_2O_5$, for instance), as more apatite and less dilutive silica is used, while operating 50-80° C. higher than expected furnace temperatures of 1250 to 1300° C. Known commercial systems allow iron ore feed agglomerates to melt in an RHF for reaction benefits. Comparatively, a rotary kiln does not handle feed stock melting well since viscous melts roll and combine with cooler bed material and continue to grow into difficult to handle lumps or "clinkers."

Several "melt" tests were conducted to determine the feed mix chemistries that can increase overall phosphate extraction yields at temperatures an RHF can sustain without the formation of damaging stickiness from the melting of the feed pellets. The experiments evaluated various furnace conditions that would allow melting of feed stock at operating temperatures from about 1250° C. to about 1350° C., with few operating issues with the molten slag. A number of tests were run at various chemistries, as measured by silica ratios (SR), to determine yields at various time and temperature profiles. During these tests, observations were made to the state of the cooled ball after melting in relation to the ability for continuous discharging and minimal sticking to refractory. Generally, at lower silica ratios, the melt is less viscous and more freely flowing.

Figure 7:
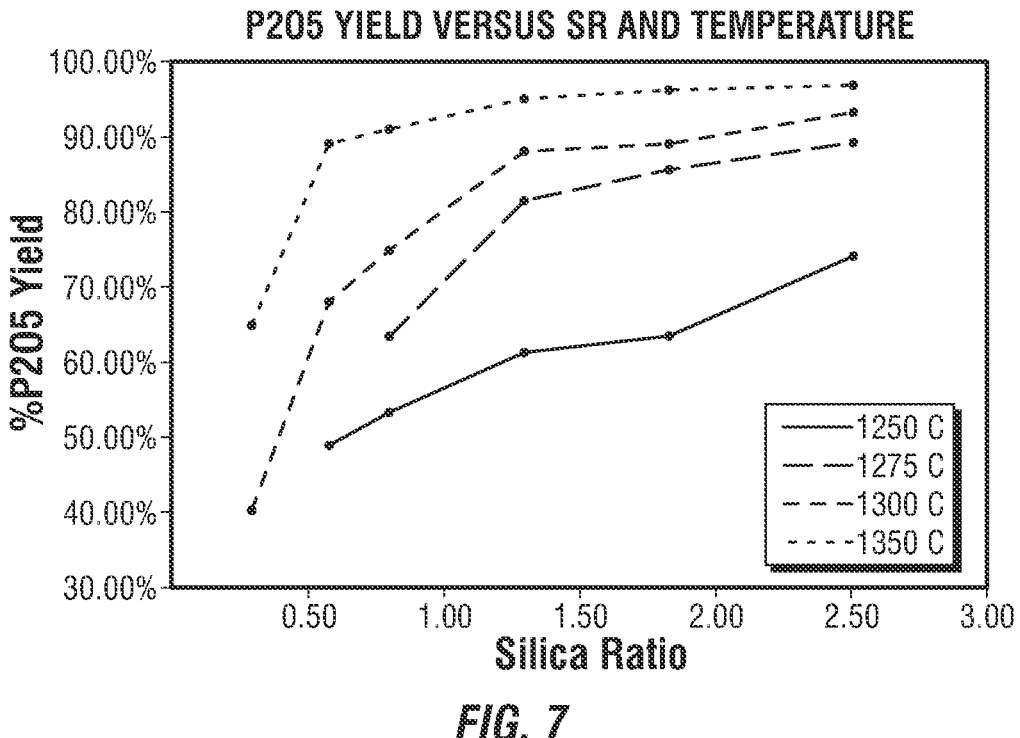
FIG. 7 is a graph of phosphate yield, as $P_2O_5$, versus silica ratio for several temperatures.
Figure 8:
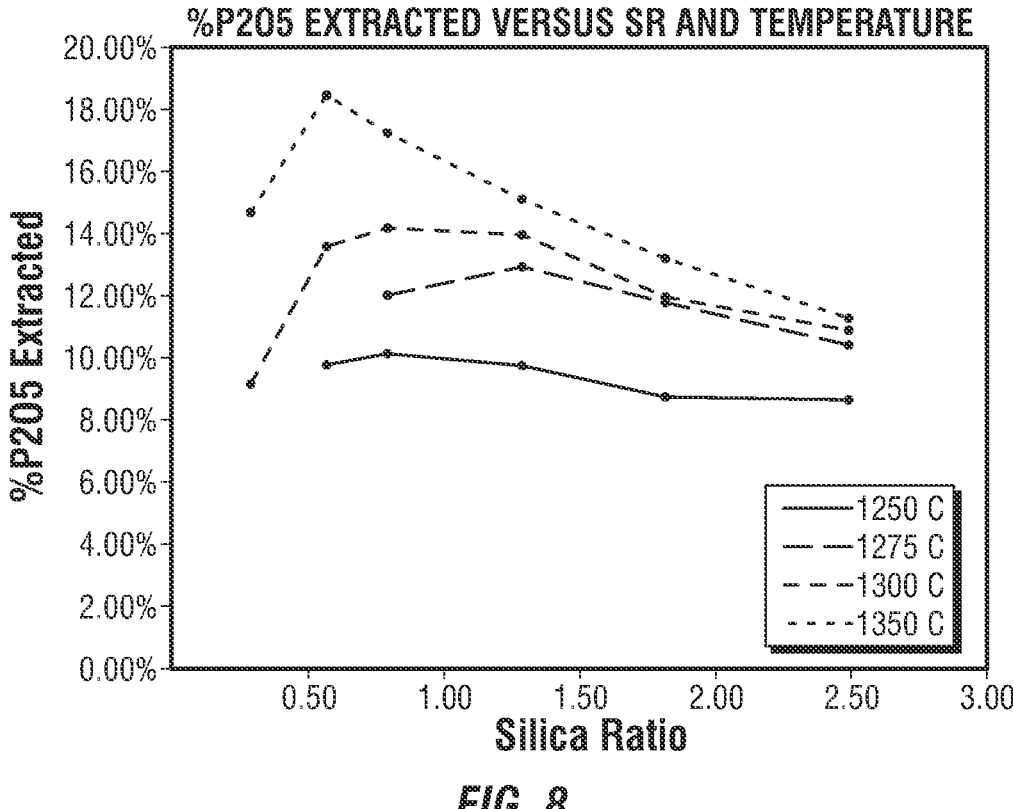
FIG. 8 is a graph of phosphate extraction, as $P_2O_5$, versus silica ratio for several temperatures.

FIGS. 7 and 8 show phosphate yield and phosphate extraction, respectively, versus silica ratios. Based on the assays used to calculate phosphate yield, phosphate extraction indicates the mass of the initial feed material extracted as $P_2O_5$. Higher extraction percentage indicates higher throughput potential. Silica ratios between 0.8 and 2.0 melted at 1250° C. and above. Yields above 90% were shown with silica ratios as low as 0.5. The data also implied that, with an increase of 50-80° C. above expected reaction temperatures, extraction rates or $P_2O_5$ throughputs can increase by 80% using the same total overall solid feed rates containing a higher $P_2O_5$ content.

Benefit D: Smaller Phosphoric Acid Recovery Plants

In a rotary kiln, direct combustion of natural gas and air is used to provide the reaction heat and temperature. This produces large quantities of combustion gases, including nitrogen. The acid scrubbing plant size is designed based on the amount of combustion gases it has to handle.

In an RHF using indirect electrical heating elements, gases from the reduction reaction (CO and gaseous P) are produced with no off gases from direct combustion of natural gas and air, thus reducing the required size of the acid scrubbing plant. Numerous electrical heating elements can be placed around the circumference of an RHF, whereas in a rotary kiln only one large burner or a few small burners are used at one end of the kiln.

As an example, a direct fired system may produce higher gas flows by weight as compared to the indirectly heated systems. In an estimate for an RHF case, about 100,000 tons per year of $P_2O_5$ with 85% availability are input to an RHF with only indirect heating and the produced gaseous P and CO are fully oxidized in an afterburner with 2% residual oxygen. In a comparable kiln case, about 100,000 tons per year of $P_2O_5$ with 85% availability are input to a ported rotary kiln with port air sufficient to oxidize all the produced gaseous P and 50% of the produced CO and the remaining CO is oxidized in an afterburner with 2% residual oxygen. Such a kiln was estimated to produce over 4 times higher gas flows by weight to the acid scrubbing plant compared to the RHF. Because the acid scrubbing plant may be made from exotic metals and liners to decrease corrosion, reduction of system size can have a material impact to capital and operating costs.

Example 1

Figure 11:
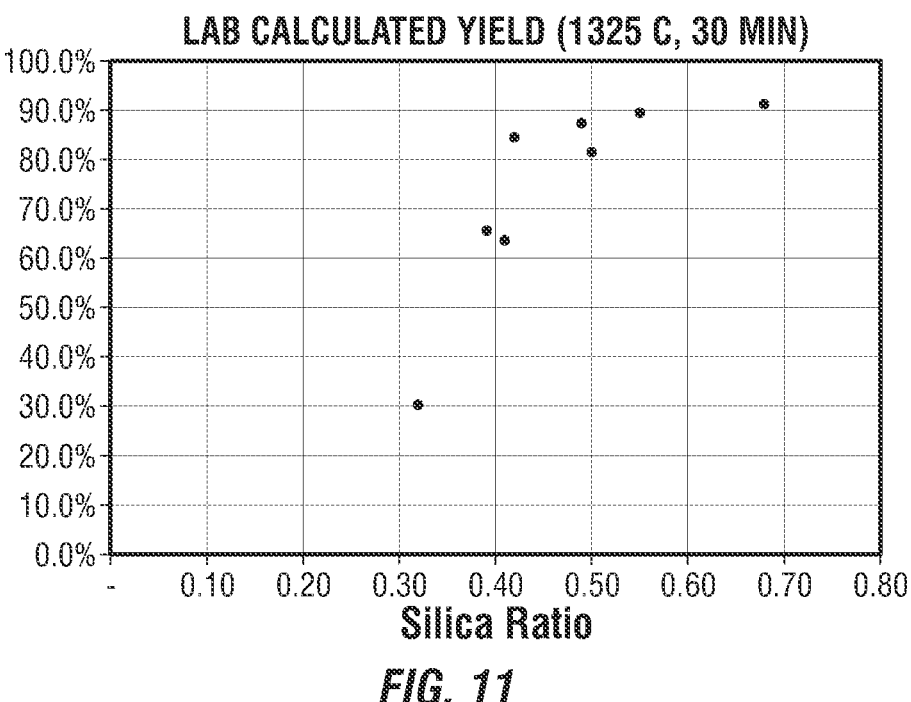
FIG. 11 is a graph of phosphate yield, as $P_2O_5$, versus silica ratio.

A series of trials were completed in a lab furnace using agglomerates with various silica ratios (SR) and containing phosphate ore from various sources at various temperatures maintained for 30 min in a carbon crucible. FIG. 11 shows the yields obtained with respect to silica ratio for one of the ore sources at 1325° C. maintained for 30 min. Generally, the higher silica ratios showed higher yield, though melting observed at SR 0.55 might be hard to handle. Most SR 0.4 to 0.5 produced yields in excess of 80% without major melting. Even though the lowest silica ratios did not achieve 80% yield, the 1325° C. was only maintained for 30 min. The lowest silica ratios could tolerate a higher temperature without melting and/or longer process time to increase yield.

Figure 12:
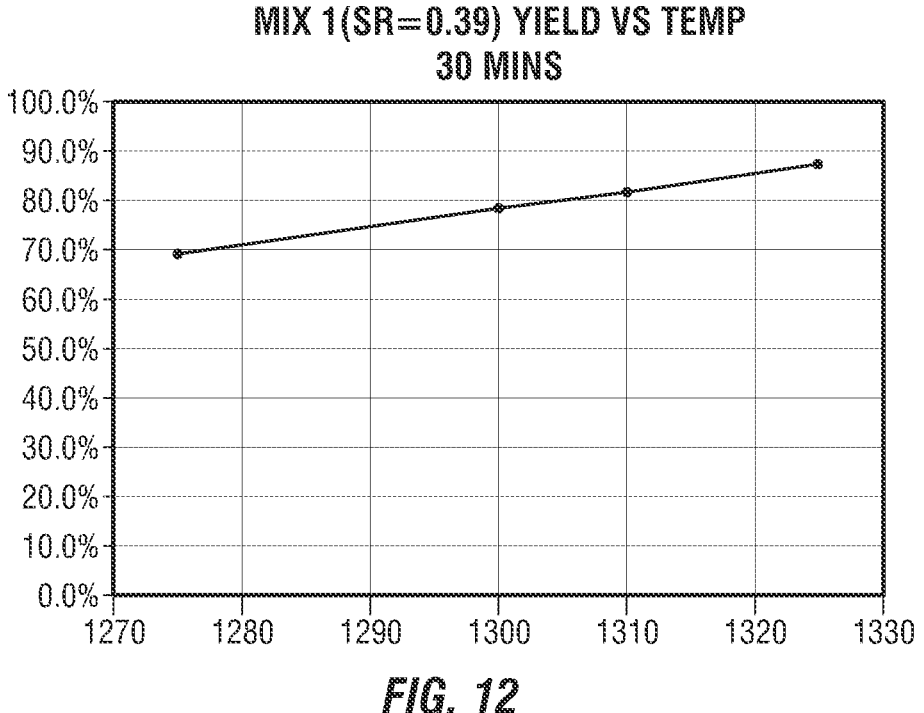
FIG. 12 is a graph of phosphate yield, as $P_2O_5$, versus temperature for Mix 1 in Table 4.

Table 4 summarizes data similar to that of FIG. 11 for various ore sources and various temperatures maintained for 30 min. Again, a general trend is apparent at each temperature that higher silica ratios showed higher yield. Though, even at SR 0.39, yield for the highest temperature exceeded 80%. FIG. 12 graphs data for Mix 1 at SR 0.39 of ore source 3, indicating that temperatures above about 1305° C. would be expected to produce 80% yield in 30 min. Table 4 likewise shows a general trend for other silica ratios that higher temperatures produced higher yield. Though, even at 1275° C., yield for the higher silica ratios exceeded 80%. The melting observed in several of the mixes occurred at 1325° C.

TABLE 4

| Mix | Ore | SR | Yield 1350° C. | Yield 1325° C. | Yield 1300° C. | Yield 1275° C. | Yield 1250° C. | Observation |
|-----|-----|------|------|------|------|------|------|-------------|
| J | 1 | 0.26 | 41% | 30.4% | | | | No melting |
| K | 2 | 0.34 | 71% | 63.6% | | | | No melting |
| F | 2 | 0.32 | | 65.8% | 55% | 46% | | No melting |
| H | 1 | 0.41 | | 84.6% | 77% | | | No melting |
| 1 | 3 | 0.39 | | 87.5% | 79% | 69% | | Minor melting at 1325° C. |
| I | 1 | 0.42 | | 81.6% | 76% | | | Minor melting at 1325° C. |
| G | 2 | 0.49 | | 89.6% | 82% | 69% | | Some melting at 1325° C. |
| A | 3 | 0.50 | | 91.5% | 86% | 84% | | Some melting at 1325° C. |
| B/C | 3 | 0.55 | | 93.4% | 92% | 87% | 70% | Low viscous melt at 1325° C. |
| E | 3 | 0.68 | | 93.6% | 93% | 91% | 81% | Low viscous melt at 1325° C. |

Example 2

Trials were conducted in a pilot-scale RHF at various silica ratios. The 6 feet diameter open (no segmentation) RHF previously used for batch annealing metal pieces was converted to allow for the continuous feed and discharge of ⅜ inch diameter agglomerates to maintain a bed of agglomerates in the furnace hot zone for 25 to 45 minutes depending on the rotational speed of the hearth floor. Heat was provided via electric heating elements suspended vertically from the furnace roof. Furnace and bed temperature were monitored continuously via thermocouples placed horizontally 3 inches above the agglomerate bed and optical pyrometers mounted on the roof for measuring the brightness of the heated agglomerate bed.

While operating at 1320° C. with a residence time of 27 min the following results were obtained: 1) SR=0.40, Yield=59%; 2) SR=0.50, Yield=68%; 3) SR=0.60, Yield=85%. Silica ratios in the feed were selected close to 0.5 due to variability in the ores to decrease the likelihood of overshooting SR 0.5 and potentially melting in the RHF, as occurred with the SR 0.60. However, the pilot data correlates well with the lab data in Example 1 and yields similar to the lab data are expect at other silica ratios and other temperatures. Even though the lowest silica ratios did not achieve 80% yield, the 1320° C. was only maintained for 27 min. The lowest silica ratios could tolerate a higher temperature without melting and/or longer process time to increase yield.

The pilot plant was also used to test a SR of 2.0 and achieved yields of greater than 80% over a 34 hour period of run time. These yields were more consistent and exceeded those obtained in a ported rotary kiln demonstration plant described in US App. Pub. No. 2019/0292055. Operating temperatures for the pilot plant with the yields >80% ranged from 1300 to 1330° C. for high silica (SR 2.0) and 1340 to 1380° C. for low silica (SR 0.7). These yields also matched with the yields obtained in lab furnace tests.

System Design

A reaction chamber with a hearth-like bed floor, such as in an RHF, may be designed in segments where selected zones can be physically separated from one another. This could allow controlled air and/or oxygen addition in a reduction zone, where carbo-thermal reduction occurs and the reaction products off gas. From 9 to 10 tons of air may be delivered per ton of phosphate as $P_2O_5$ input to the chamber. Gaseous P and CO can ignite, consuming oxygen and providing a large heat source to maintain reaction temperatures and to decrease demand for external heat sources. A preheating zone may preheat agglomerates to reduction temperatures in a controlled atmosphere. Thus, the reduction zone and the preheating zone could together form the hot zone, where exposure to temperatures sufficient for reduction occurs.

FIGS. 1-4 show one example of an RHF with segmented zones. The methods herein may be implemented in an RHF 10, as shown, as well as in the reaction chambers of other systems. Likewise, the concept of segmented zones in a reaction chamber may be implemented in a manner other than shown for RHF 10. In FIGS. 1-4, RHF 10 includes an annular reaction chamber 12 bounded by a roof 14, an inner sidewall 16, an outer sidewall 18, and a floor 20, though shapes other than annular are conceivable. During operation, reaction chamber 12 contains a bed of feed agglomerates and a freeboard above the bed where off gases collect. Roof 14, inner sidewall 16, and outer sidewall 18 include several layers (not shown), such as both structural and insulation layers, used in known RHFs. Floor 20 also includes several layers shown as a hearth table 30 supporting a hearth 22. In turn, hearth 22 includes a lower refractory 28 and an upper refractory 26 thereon. Upper refractory 26 provides a bed floor whereon agglomerates may be placed for subsequently forming a reducing bed. As the term is used herein, a "reducing bed" refers to the portion of the bed of feed agglomerates where reduction is occurring.

A support frame 38 holds roof 14, inner sidewall 16, and outer sidewall 18 stationary while hearth 22, with its annular shape, rotates in clockwise bed direction 98 along reaction chamber 12. Known RHF drive mechanisms may be used to rotate hearth 22. FIGS. 1-4 show a sprocket 32 positioned at the periphery of hearth table 30 and engaged with a gear box 42 powered by a motor 44. As motor 44 activates gear box 42, the engaged gear box 42 advances sprocket 32 and rotates floor 20. Hearth table 30 rests on four wheels 46 secured to hearth table 30 with wheel brackets 38. Support frame 38 provides a circular track 40 on which wheels 46 travel as hearth table 30 rotates.

Figure 3:
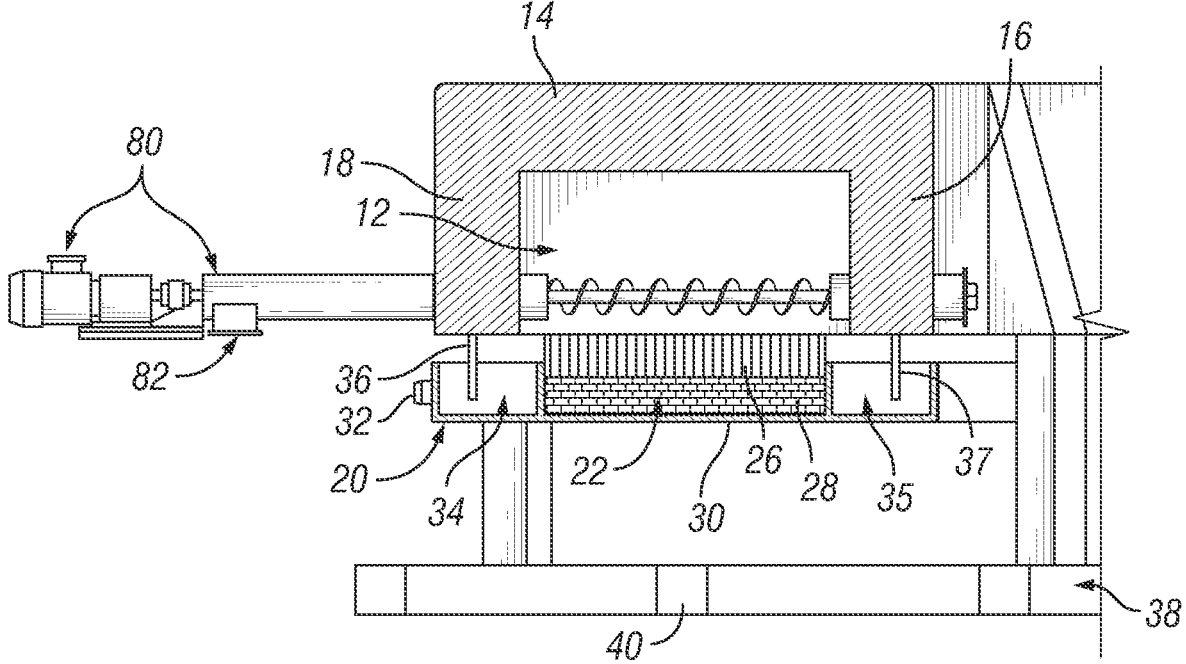
FIG. 3 is a partial, radial sectional view of the RHF in FIG. 1 taken along line 3-3 shown in FIG. 1.

To limit gas entry and exit, outer sidewall 18 includes a seal wall 36 that extends downward into a seal trough 34 (shown only in FIG. 3). Likewise, inner sidewall 16 includes a seal wall 37 that extends downward into a seal trough 35. Seal troughs 34 and 35 may be filled with a liquid, such as high temperature oil, to contain the atmosphere inside reaction chamber 12 even when floor 20 rotates.

Figure 4:
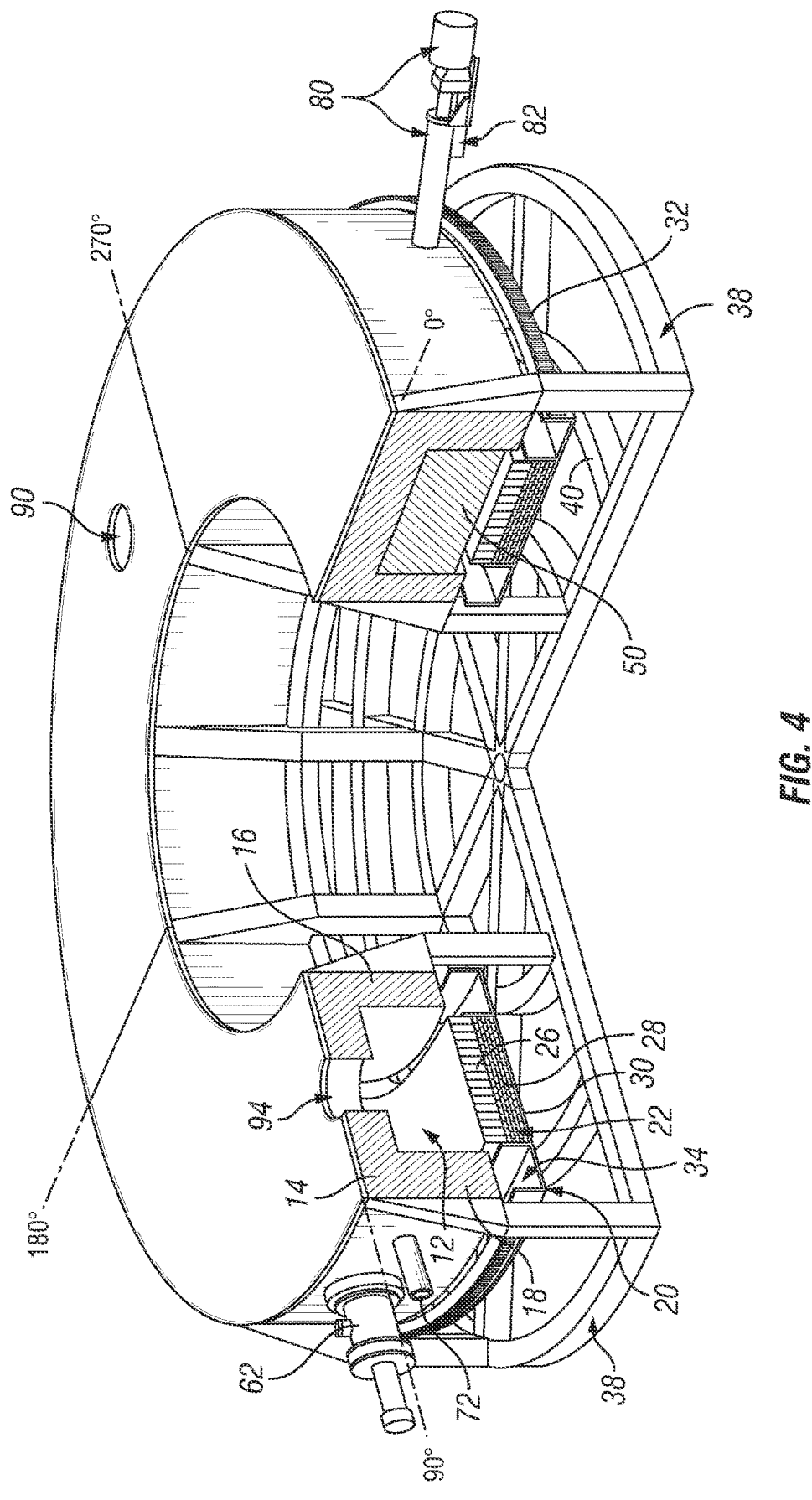
FIG. 4 is a quartered sectional view of the RHF in FIG. 1 taken along line 4-4 shown in FIG. 1.

Even though RHFs are known, RHF 10 is configured differently for use as a phosphorus production system. For example, reaction chamber 12 is segmented into a reduction zone differentiated from a preheat zone by a barrier wall 52. In FIGS. 1 and 4, positions around the radius of RHF 10 are designated with degree markings at 0°, 90°, 180°, and 270°. For the configuration shown in FIGS. 1-4, barrier wall 52 is placed at 60° where it differentiates a reduction zone past 60° from a preheat zone before 60°. Hearth 22 is configured to move continuously from the preheat zone to the reduction zone during operation. As may be appreciated from FIGS. 1-4, the rotation of hearth 22 occurs in a horizontal plane such that agglomerates placed thereon may be substantially stable at least while in the reduction zone.

RHF 10 additionally includes a barrier wall 54 further segmenting reaction chamber 12 into a cooling zone differentiated from the reduction zone. Barrier wall 54 is placed at 270° in the configuration shown. Hearth 22 is configured to move continuously from the reduction zone to the cooling zone during operation. The cooling zone of reaction chamber 12 is not heated by an external source, but the reduction reaction may continue into the cooling zone until the agglomerates cool sufficiently or the phosphate or carbon reactant is consumed. The reducing bed may cease to exist in the reduction zone if the phosphate or carbon reactant is consumed. Consequently, the hot zone spans 270° and includes the preheat zone spanning 60° and the reduction zone spanning 210°. A reducing bed may begin to form in the preheat zone and may continue to exist into the cooling zone.

RHF 10 further includes a barrier wall 50 segmenting reaction chamber 12 and differentiating the cooling zone from the preheat zone. Barrier wall 50 is placed at 0° in the configuration shown. Hearth 22 is configured to move continuously from the cooling zone to the preheat zone during operation.

Barrier walls 50, 52, and 54 decrease gas transfer between the zones and extend downward from roof 14 to just above agglomerates placed on upper refractory 26 with a gap sufficient for agglomerates to pass underneath. Consequently, a continuous agglomerate feed mechanism (not shown) may place feed agglomerates on upper refractory 26 upstream from barrier wall 50 such that the agglomerates settle into a bed as they enter the preheat zone. A continuous carbon feed mechanism (not shown) may place a carbonaceous material as a protective layer among the agglomerates. Agglomerates then move continuously through the preheat zone between barrier walls 50 and 52 where they may reach reduction temperatures before entering the reduction zone. Agglomerates continue around reaction chamber 12, entering the cooling zone past barrier wall 54. A screw conveyor 80 (or a scraper, not shown) removes agglomerates from the cooling zone and routes them through a discharge 82 to a cooler (not shown).

RHF 10 includes burners 60, 62, 64, and 66 positioned respectively at 70°, 125°, 185°, and 240° as direct-fired fuel burners to maintain reduction temperatures in the reduction zone. Burners 60, 62, 64, and 66 include inputs for fuel as well as inputs for combustion air. RHF 10 additionally includes ports 70, 72, 74, and 76 positioned respectively at 65°, 115°, 175°, and 230° as air and/or oxygen ports to facilitate combusting gaseous P and CO off gasses, thereby to heat the reduction zone additionally. Although not shown in FIGS. 1-4, RHF 10 further includes one or more indirect heating sources in the preheat zone, such as electric heating elements and/or radiant tube burners.

Notably, RHF 10 includes one or more direct-fired burners in the reduction zone, but not in the preheat zone. Also, RHF 10 includes one or more over-bed air and/or oxygen ports above hearth 22 in the reduction zone, but not in the preheat zone. In this manner, the preheat zone is configured to maintain a reducing freeboard during a carbo-thermal reduction reaction among feed agglomerates on hearth 22. Likewise, RHF 10 provides a cooling zone that lacks any direct-fired burners, over-bed air and/or oxygen ports, and indirect heating sources. In this manner, the reducing bed cools to below reduction temperatures, halting the reduction reaction without heat addition from external sources or off gas combustion.

Figure 2:
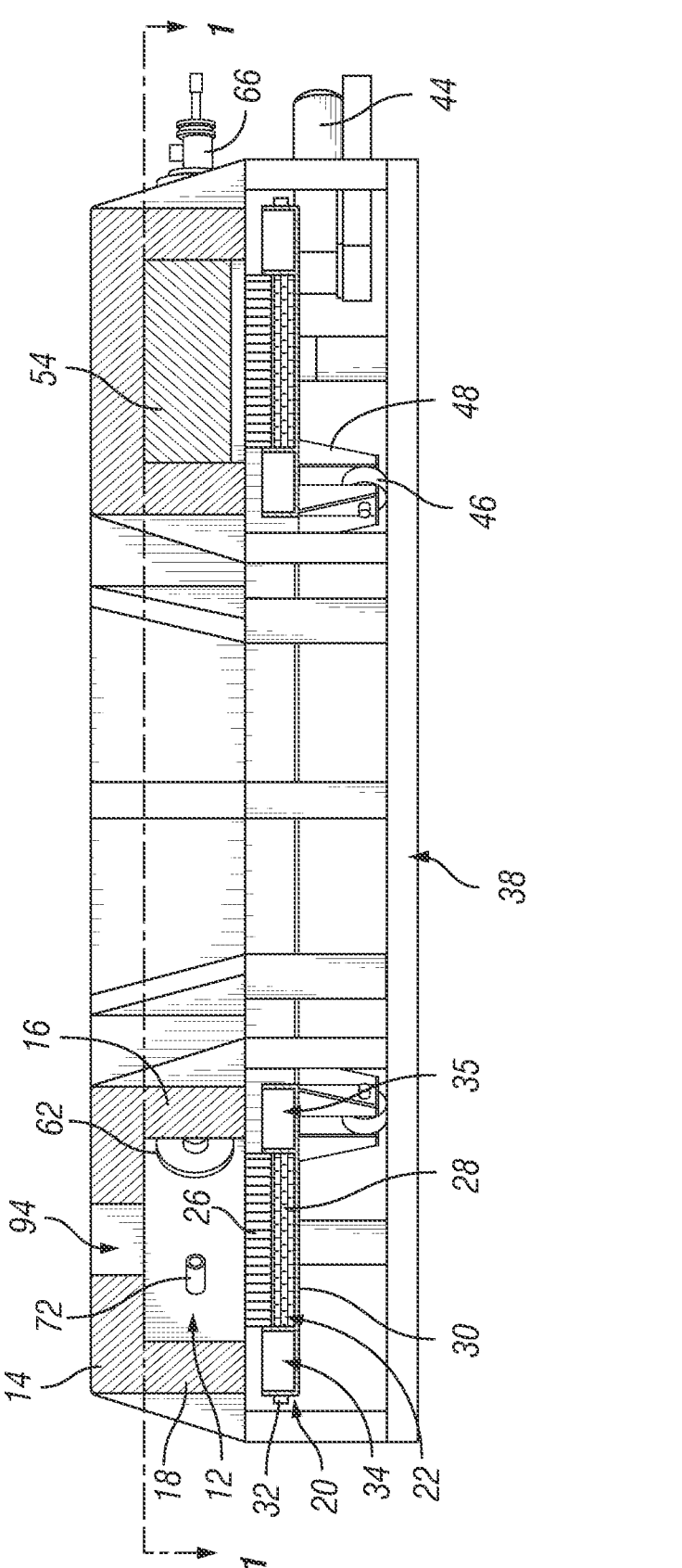
FIG. 2 is a side sectional view of the RHF in FIG. 1 taken along line 2-2 shown in FIG. 1.

RHF 10 includes a vent 90 through roof 14 at 260° for removing off gas upstream from barrier wall 54 for subsequent processing. Off gas flows clockwise in off gas direction 96 along reaction chamber 12, co-current with bed direction 98, to allow for heating the bed by the hot off gas as it moves through reaction chamber 12. A vent 92 at 30° collects off gases from the preheat zone and transfers them to the reducing zone via a vent 94 at 90°. Vent 94 is shown in FIGS. 2 and 4 and vent 90 is shown in FIG. 4. Vents 90, 92, and 94 cannot literally be seen in the sectional view shown in FIG. 1, but their locations are superimposed with crosshatched spaces in FIG. 1, showing their position relative to the other components in FIG. 1.

While the description of FIGS. 1-4 specifies certain numbers and locations of burners, ports, vents, wheels, and barrier walls, it will be appreciated that more or fewer may be provided or located in other positions, depending on the diameter, throughput, and other design criteria of an RHF or other system. Likewise, the positions of burner, ports, vents, wheels, and barrier walls may be different. Also, the numbers and locations of measurement devices to monitor temperature in reaction chamber 12 are not shown. FIGS. 1-4 are one example of a design for a demonstration plant RHF with a smaller diameter and less throughput than a commercial-scale RHF. A larger RHF may include additional burners, ports, measurement devices, wheels, and vents to accommodate maintaining reduction temperature along a longer reducing bed and collecting a greater off gas volume. Similar considerations may be made in adapting the segmentation concepts described herein into systems other than RHFs.

Example 3

During an additional trial conducted along with the trials of Example 2, energy use of 76 kiloWatts (kW) was measured without port air introduced into the pilot scale RHF. Then, energy use of 45 kW was measured after port air introduction under otherwise the same conditions. The difference represents a 40% reduction in energy. An engineering model for operation with port air at 90% yield estimated a 60% reduction in energy by adding port air to combust gaseous P and CO in the reaction chamber.

Elemental Phosphorus Production

Figure 9:
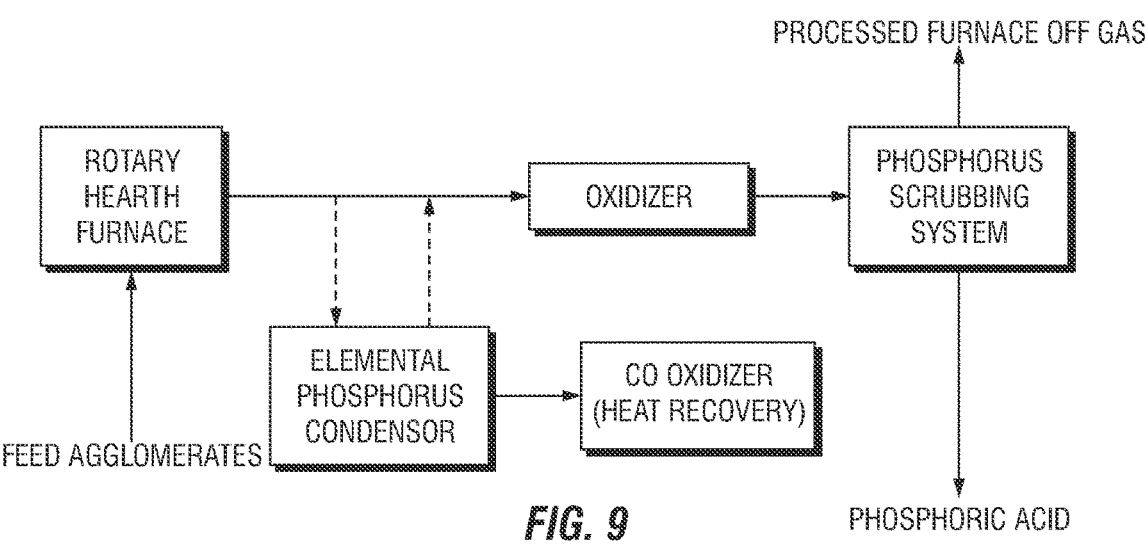
FIG. 9 is a diagram of a system for producing elemental phosphorus and phosphoric acid.
Figure 10:
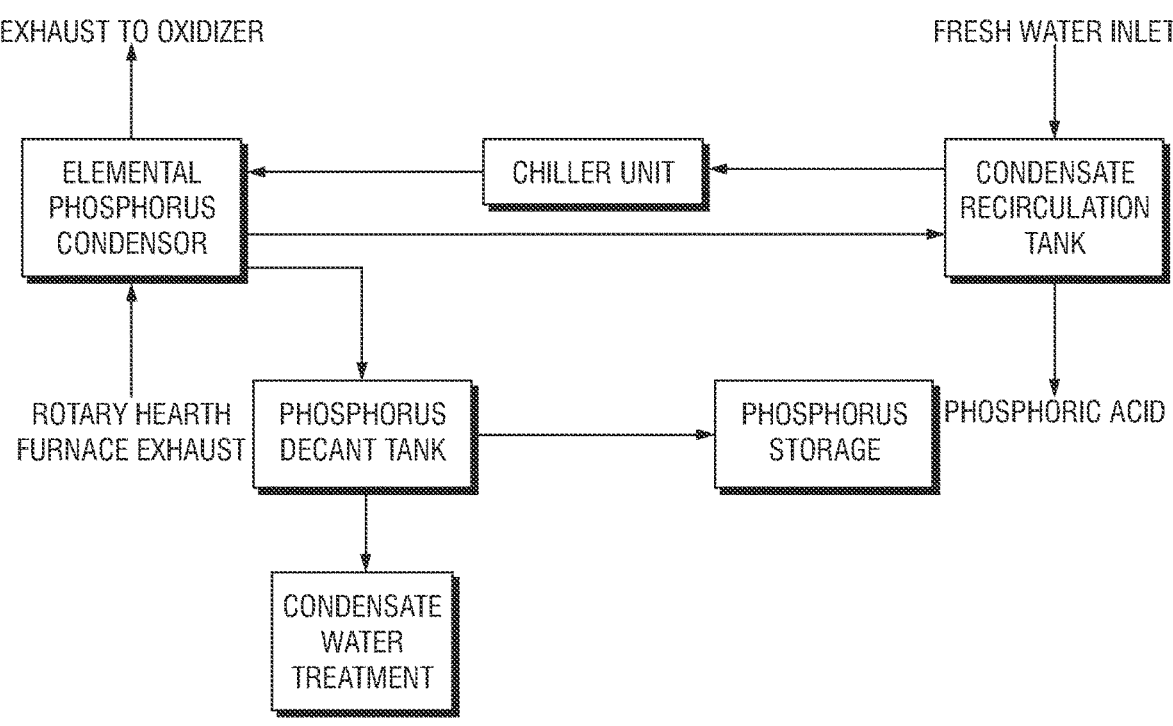
FIG. 10 is a diagram of system for producing elemental phosphorus that includes the elemental phosphorus condenser of FIG. 9.

Off gas from a reducing bed of phosphatic agglomerates initially contains CO and elemental phosphorus in the form of gaseous P. The reaction may be performed under reducing conditions to decrease oxidation of gaseous P so that collected off gas still contains elemental phosphorus. FIG. 9 shows incorporation of an elemental phosphorus condenser into the RHF system, as one example, when desired, as represented with dashed lines. The elemental phosphorus condenser may be incorporated into other systems that produce gaseous P. Instead of oxidizing the phosphorus for phosphoric acid recovery, as shown in FIG. 9, the collected off gas may be directed through a phosphorus condenser, as shown in FIG. 10, in which chilled water sprays are used to condense elemental phosphorus. This water is drained to a condensate recirculation tank, passes through a chiller unit, and is returned to the condenser.

Solid phosphorus precipitates in the condensate liquid stream and settles in a condensate drain tank (not shown) of the phosphorous condenser and/or the condensate recirculation tank. Precipitates are periodically removed to a phosphorus decant tank from which they are removed and stored as elemental phosphorus product. The solid elemental phosphorus can be further purified or converted to phosphoric acid. Condensate water that collects in the decant tank is pumped to a condensate water treatment system. The liquid level in the condensate drain tank or condensate recirculation tank is maintained by adding fresh water as needed.

The exhaust gas from the condenser contains some remaining phosphorus along with carbon monoxide. This exhaust gas from the condenser may be further oxidized for heat and/or phosphoric acid recovery. The residual phosphorus gas and carbon monoxide from the phosphorus condenser may be oxidized in an oxidizer by the introduction of oxygen to form phosphorus pentoxide and carbon dioxide gases. Elemental phosphorus gas auto ignites in presence of oxygen, providing the ignition source and heat for combustion of the carbon monoxide. A small quantity of natural gas may be introduced along with oxygen in the oxidizer to compensate for heat losses occurring in the elemental phosphorus condenser. The oxidized phosphorus is then scrubbed in a secondary scrubbing system (not shown) to form phosphoric acid while carbon dioxide gas is released to the atmosphere through the exhaust stack.

Example 4

During additional trials conducted along with Example 2, elemental phosphorus was kept in the off gas of the pilot scale RHF by not introducing port air into the RHF or the thermal oxidizer. The resulting elemental phosphorus was recovered using an existing acid plant as a cooler and condenser. Red phosphorus was obtained and ignited once filtered and dried.

Co-Product Production

The processed agglomerates may provide a companion product to the elemental phosphorus and/or phosphoric acid. This co-product may be in the form of a lightweight aggregate. It is estimated that for every ton of phosphoric acid produced, about 4 to 7 tons of this companion product will be produced. Preliminary tests of this co-product showed substantial benefits, including:

1. Lighter weight compared to known aggregate, which decreases the overall weight of concrete products for easier handling, and lower transportation and construction costs.
2. High moisture absorption capacity, which can be a source of internal curing for concrete, thus contributing to better quality and enhanced durability.
3. Possible pozzolanic characteristics of the finely ground form of this co-product (~45 μm) can enhance cement hydration in concrete to yield higher strength and greater durability at a lower cost compared to other pozzolanic/cementitious additives such as coal combustion fly ash and blast furnace slag. With limited and dwindling sources of fly ash and slag in the United States, the availability of this co-product in finely ground form has the potential to meet some demands of the concrete industry.
4. Lower overall carbon footprint of 0.73 tons CO2/ton co-product versus 1.25 tons CO2/ton cement.

Preliminary analysis of the chemical composition and physical properties of this material indicates that they are similar to the specifications for Portland cement, and granulated blast furnace slag and coal combustion fly ash used in concrete and mortars.

Example 5

A variety of mortar mixtures were prepared with 100% ordinary Portland cement (OPC) as a control, coal combustion fly ash in OPC as a second control, and ground processed pellets in OPC. The ground pellets were from the high silica ($SR \geq 2.0$) and low silica ($SR \leq 0.7$) pellets in Example 2 above. Coarsely ground (approximately 67-70% less than 45 μm) and finely ground (approximately 72-80% less than 45 μm) particles of the high silica and low silica pellets were evaluated. Water and ASTM C33 natural silica sand were combined with OPC and fly ash or OPC and ground pellets to form a mortar, which was cured and subjected to compression testing. Table 5 demonstrates the strength potential for co-product processed agglomerates in cement. The high silica pellets generally performed similarly to or better than the 20% fly ash.

TABLE 5

| | Average Compressive Strength (psi) | | | |
| Sample | 3-day | 7-day | 28-day | 90-day |
|---|---|---|---|---|
| 100% cement | 2689 | 3070 | 4057 | 4704 |
| 20% fly ash | 2301 | 2956 | 3393 | 4285 |
| 15% high-silica, fine-grind | 2395 | 3563 | 3852 | 4941 |
| 15% high-silica, coarse-grind | 2843 | 3239 | 3957 | 4950 |
| 25% high-silica, fine-grind | 2422 | 3077 | 3947 | 5319 |
| 25% high-silica, coarse-grind | 2509 | 3003 | 3679 | 5899 |
| 15% low-silica, fine-grind | 1525 | 2785 | 3701 | |
| 15% low-silica, coarse-grind | 1239 | 2094 | 2477 | |
| 25% low-silica, fine-grind | 1525 | 2431 | 3420 | |
| 25% low-silica, coarse-grind | 1331 | 2477 | 3258 | |

Method, Systems, and Compositions

The discoveries described herein identify a number of solutions that may be implemented in methods, systems, and compositions also described herein. Multiple solutions may be combined for implementation, enabling still further methods, systems, and compositions. The inventors expressly contemplate that the various options described herein for individual methods, systems, and compositions are not intended to be so limited except where incompatible. The features and benefits of individual methods herein may also be used in combination with systems, compositions, and other methods described herein even though not specifically indicated elsewhere. Similarly, the features and benefits of individual systems herein may also be used in combination with methods, compositions, and other systems described herein even though not specifically indicated elsewhere. Further, the features and benefits of individual compositions herein may also be used in combination with methods, systems, and other compositions described herein even though not specifically indicated elsewhere.

Phosphorus Production Method A includes forming a reducing bed containing feed agglomerates in a reaction chamber by heating the feed agglomerates. The feed agglomerates include a core initially containing phosphate ore and carbonaceous material, the core initially providing a formula weight ratio of silicon dioxide to calcium oxide plus magnesium oxide ranging from 0.3 to 0.7. Method A includes maintaining a temperature in the reaction chamber from 1250 to 1380° C., such as from 1250 to 1350° C., along at least a portion of the reducing bed. Off gas is generated from the reaction chamber, the off gas containing phosphorus in the form of elemental phosphorus and/or phosphorus pentoxide. Method A includes collecting phosphorus from the off gas and removing from the reaction chamber a residue containing processed agglomerates. Less than 20% of the phosphate initially in the feed agglomerates remains in the residue.

Additional features may be implemented in Method A. By way of example, Method A may include continuously moving the reducing bed through the reaction chamber with the feed agglomerates substantially stable while in the reducing bed. The reducing bed may be formed on a rotating bed floor in the reaction chamber, such as in an RHF, including on an annular, rotating hearth of the RHF.

The heating of the feed agglomerates may include heating the feed agglomerates at the reaction chamber temperature of 1250 to 1380° C., such as 1250 to 1350° C. The heating may occur under a reducing freeboard at least until after a carbo-thermal reduction reaction begins, which forms the reducing bed. The heating of the feed agglomerates may occur together with the maintaining of the temperature of 1250 to 1380° C. One example includes placing ambient temperature feed agglomerates in the reaction chamber maintained at the temperature of 1250 to 1380° C. Alternatively, at least part of the heating could occur separate from the maintaining of the temperature, such as in a part of the reaction chamber not at 1250 to 1380° C. or perhaps even outside the reaction chamber. Accordingly, feed agglomerates preheated elsewhere to above ambient temperature could be placed in the reaction chamber.

For any reaction chamber temperatures exceeding 1180° C., the reducing bed may be exposed for less than 60 minutes, such as 45 minutes or less. The feed agglomerates may be heated for 30 minutes to less than 60 minutes, such as 30 to 45 minutes, at the reaction chamber temperature of 1250 to 1380° C. Method A may further include melting at least a portion of the core in at least some of the agglomerates heated at the 1250 to 1380° C. reaction chamber temperature.

Method A may further include delivering over-bed air and/or oxygen through a plurality of ports above the reducing bed. From 9 to 10 tons of air may be delivered per ton of phosphate as $P_2O_5$ input to the chamber. The reaction chamber used in Method A may include a barrier wall segmenting the reaction chamber into a reduction zone differentiated from a preheat zone and one or more over-bed air and/or oxygen ports above the reducing bed in the reduction zone, but not in the preheat zone. Method A may further include delivering over-bed air and/or oxygen to the reduction zone through the one or more ports, but not delivering over-bed air and not delivering over-bed oxygen to the preheat zone.

The phosphate ore used in Method A may contain silicon dioxide and the core initially might not contain supplemental silicon dioxide in addition to the silicon dioxide in the phosphate ore. Alternatively, supplemental silicon dioxide may be included in the initial core. The core may initially provide a phosphate content of greater than 13 weight % as $P_2O_5$, such as at least 17 wt %, including 17 to 20 wt %. The feed agglomerates may further include a protective coating on the core, the coating containing carbonaceous material particles. The coating may have a thickness from 0.5 to 0.7 millimeters or provide about 1-3 wt % extra carbon to the initial core. In Method A, less than 15% of the phosphate initially in the feed agglomerates might remain in the residue, such as less than 10%, including less than about 7%.

Method A may further include exothermically oxidizing elemental phosphorus and carbon monoxide in the off gas while still in the reaction chamber, thereby adding heat to the reducing bed.

The processed agglomerates produced in Method A may contain phosphate ore residue and calcium silicate and exhibit pozzolanic properties suitable for supplementary cementitious material at least when ground to a particle size of approximately 45 micrometers.

In Method A, the feed agglomerates in the reducing bed may be below a reducing freeboard and the phosphorus in the off gas may be in the form of elemental phosphorus. Then, Method A may further include oxidizing elemental phosphorus outside of the reaction chamber to phosphorus pentoxide, the collecting of the phosphorus from the off gas including collecting the phosphorus pentoxide as phosphoric acid. Instead, or in addition, Method A may further include collecting elemental phosphorus from the off gas as elemental phosphorus.

The described additional features of Method A may also be implemented in Methods B and E below. System C and Composition D below may be used in Method A and Composition F below may be produced by Method A.

Phosphorus Production Method B includes forming a reducing bed containing feed agglomerates in a reaction chamber by heating the feed agglomerates. The feed agglomerates include a core initially containing phosphate ore and carbonaceous material. Method B includes continuously moving the reducing bed through the reaction chamber with the feed agglomerates substantially stable while in the reducing bed. A temperature is maintained in the reaction chamber from 1250 to 1380° C., such as from 1250 to 1350° C., along at least a portion of the reducing bed. Off gas is generated from the reaction chamber, the off gas containing phosphorus in the form of elemental phosphorus and/or phosphorus pentoxide. Method B includes collecting phosphorus from the off gas and removing from the reaction chamber a residue containing processed agglomerates.

Additional features may be implemented in Method B. By way of example, the core may initially provide a formula weight ratio of silicon dioxide to calcium oxide plus magnesium oxide ranging from 0.3 to 0.7. Instead, the core may initially provide a formula weight ratio of silicon dioxide to calcium oxide plus magnesium oxide higher than 1.6, such as 2.0 and higher, including from 2.0 to 2.5. Less than 20% of the phosphate initially in the feed agglomerates might remain in the residue, such as less than 15%, including less than 10%, for example, less than about 7%.

The described additional features of Method A above may also be implemented in Method B. The described additional features of Method B may also be implemented in Method E below. System C and Composition D below may be used in Method B and Composition F below may be produced by Method B.

Phosphorus Production System C includes a reaction chamber, a barrier wall segmenting the reaction chamber into a reduction zone differentiated from a preheat zone, and a bed floor at a bottom of the reaction chamber. The bed floor is configured to move continuously from the preheat zone to the reduction zone during operation while keeping feed agglomerates thereon substantially stable at least while in the reduction zone. System C includes one or more direct-fired burners in the reduction zone, but not in the preheat zone, and one or more over-bed air and/or oxygen ports above the bed floor in the reduction zone, but not in the preheat zone. One or more indirect heating sources are in the preheat zone.

Additional features may be implemented in System C. By way of example, the preheat zone may be configured to maintain a reducing freeboard during a carbo-thermal reduction reaction among feed agglomerates on the bed floor. The bed floor may be a rotating bed floor, such as in an RHF, for example, an annular, rotating hearth of the RHF. The one or more indirect heating sources may include electric heating elements and/or radiant tube burners.

System C may further include a second barrier wall further segmenting the reaction chamber into a cooling zone differentiated from the reduction zone. The bed floor may be configured to move continuously from the reduction zone to the cooling zone during operation. The cooling zone may lack the direct-fired burners, the over-bed air and oxygen ports, and the indirect heating sources. The bed floor may be a rotating bed floor and System C may further include a third barrier wall further segmenting the reaction chamber and differentiating the cooling zone from the preheat zone. The bed floor may be configured to move continuously from the cooling zone to the preheat zone during operation.

The described additional features of System C may also be used in Methods A and B above and in Method E below. System C may process Composition D below. Composition F below may result from methods carried out in System C.

Composition D, a phosphate ore feed agglomerate, includes a core containing phosphate ore and carbonaceous material. The core provides a formula weight ratio of silicon dioxide to calcium oxide plus magnesium oxide ranging from 0.3 to 0.7 and a phosphate content of greater than 13 weight % as $P_2O_5$.

Additional features may be implemented in Composition D. By way of example, the phosphate ore in Composition D may contain silicon dioxide and the core does not contain supplemental silicon dioxide in addition to the silicon dioxide in the phosphate ore. Alternatively, supplemental silicon dioxide may be included in the initial core. The core may provide a phosphate content of at least 17 wt %, including 17 to 20 wt %. The feed agglomerates may further include a protective coating on the core, the coating containing carbonaceous material particles. The coating may have a thickness from 0.5 to 0.7 millimeters or provide about 1-3 wt % extra carbon to the initial core. The core may contain from 8 to 10 wt % green petroleum coke as the carbonaceous material. The phosphate ore and carbonaceous material may be approximately homogeneously distributed phosphate ore particles and carbonaceous material particles. The supplemental silicon dioxide may be approximately homogeneously distributed silica particles.

The described additional features of Composition D may also be used in Methods A and B above and in Method E below. System C above may process Composition D. Composition F below may result from methods that process Composition D.

A Method E for producing a reduction product includes forming a reducing bed containing feed agglomerates in a reaction chamber by heating the feed agglomerates. The feed agglomerates include a core initially containing an oxidizing agent and a reducing agent. Method E includes continuously moving the reducing bed through the reaction chamber with the feed agglomerates substantially stable while in the reducing bed. A temperature is maintained in the reaction chamber along at least a portion of the reducing bed partly by adding heat from a first heat source. Gaseous products are generated that enter a freeboard over the reducing bed from a reduction-oxidation reaction occurring in the reducing bed, the gaseous products containing a reduction product from reduction of the oxidizing agent and an incompletely oxidized oxidation product from oxidation of the reducing agent. Method E includes exothermically oxidizing the reduction product in the freeboard while still in the reaction chamber and exothermically further oxidizing the incompletely oxidized oxidation product in the freeboard while still in the reaction chamber, thereby adding heat to the reducing bed from the freeboard as a second heat source to reach the temperature in the reaction chamber. Method E includes collecting oxidized reduction product and/or remaining, unoxidized reduction product, if any, from the off gas and removing from the reaction chamber a residue containing processed agglomerates.

Additional features may be implemented in Method E. By way of example, the reducing agent may be carbon, the reduction-oxidation reaction may be a carbo-thermal reduction reaction, the incompletely oxidized oxidation product may be carbon monoxide, and the carbon monoxide may be exothermically further oxidized to form carbon dioxide. The oxidizing agent may be phosphate, the reduction product may be phosphorus, and the phosphorus in the off gas may be exothermically oxidized to form phosphorus pentoxide. The phosphate may be comprised by phosphate ore containing silicon dioxide and the core initially might not contain supplemental silicon dioxide in addition to the silicon dioxide in the phosphate ore. Alternatively, supplemental silicon dioxide may be included in the initial core. The temperature in the reaction chamber may range from 1250 to 1380° C., including from 1250 to 1350° C.

The core may initially provide a formula weight ratio of silicon dioxide to calcium oxide plus magnesium oxide ranging from 0.3 to 0.7. Instead, the core may initially provide a formula weight ratio of silicon dioxide to calcium oxide plus magnesium oxide higher than 1.6, such as 2.0 and higher, including from 2.0 to 2.5. Less than 20% of the phosphate initially in the feed agglomerates might remain in the residue, such as less than 15%, including less than 10%, for example, less than about 7%.

The heating of the feed agglomerates may include heating the feed agglomerates at the reaction chamber temperature. The heating may occur under a reducing freeboard at least until after a carbo-thermal reduction reaction begins, which forms the reducing bed. The heating of the feed agglomerates may occur together with the maintaining of the temperature. One example includes placing ambient temperature feed agglomerates in the reaction chamber maintained at the temperature. Alternatively, at least part of the heating could occur separate from the maintaining of the temperature, such as in a part of the reaction chamber not at the temperature or perhaps even outside the reaction chamber. Accordingly, feed agglomerates preheated elsewhere to above ambient temperature could be placed in the reaction chamber.

For any reaction chamber temperatures exceeding 1180° C., the reducing bed may be exposed for less than 60 minutes, such as 45 minutes or less. The feed agglomerates may be heated for 30 minutes to less than 60 minutes, such as 30 to 45 minutes, at the reaction chamber temperature. Method E may further include melting at least a portion of the core in at least some of the agglomerates heated at the reaction chamber temperature.

The described additional features of Methods A and B above may also be implemented in Method E. System C and Composition D above may be used in Method E and Composition F below may be produced by Method E.

Composition F, a supplementary cementitious material (SCM), includes a flowable particulate material containing phosphate ore residue and calcium silicate and exhibiting pozzolanic properties suitable for SCM.

Additional features may be implemented in Composition F. By way of example, 60% or more, such as 60 to 80%, of the flowable particulate material has a particle size less than 45 μm. The flowable particulate material may contain about 20-40% CaO and about 32-66% $SiO_2$. A method for making a cement-containing product may include supplementing the addition of Portland cement with the SCM.

The described additional features of Composition F may also be used in Methods A, B, and E above. System C above may produce processed agglomerates suitable for forming Composition F. Composition F may result from methods that process Composition D above.

Although minima and maxima are listed for the above described ranges and other ranges designated herein, it should be understood that more narrow included ranges may also be desirable and may be distinguishable from prior art. Also, processing principles discussed herein may provide an additional basis for the lesser included ranges.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

| TABLE OF REFERENCE NUMERALS FOR FIGURES | |
| --- | --- |
| 10 | rotary hearth furnace |
| 12 | reaction chamber |
| 14 | roof |
| 16 | inner sidewall |
| 18 | outer sidewall |
| 20 | floor |
| 22 | hearth |
| 26 | upper refractory |
| 28 | lower refractory |
| 30 | hearth table |
| 32 | sprocket |
| 34 | seal trough |
| 35 | seal trough |
| 36 | seal wall |
| 37 | seal wall |
| 38 | support frame |
| 40 | track |
| 42 | gear box |
| 44 | motor |
| 46 | wheel |
| 48 | wheel bracket |
| 50 | barrier wall |
| 52 | barrier wall |
| 54 | barrier wall |
| 60 | burner |
| 62 | burner |
| 64 | burner |
| 66 | burner |
| 70 | port |
| 72 | port |
| 74 | port |
| 76 | port |
| 80 | screw conveyor |
| 82 | discharge |
| 90 | vent |

-continued

| TABLE OF REFERENCE NUMERALS FOR FIGURES | |
| --- | --- |
| 92 | vent |
| 94 | vent |
| 96 | off gas direction |
| 98 | bed direction |

What is claimed is:

1. A method for producing a reduction product comprising:

forming a reducing bed containing feed agglomerates in a reaction chamber by heating the feed agglomerates, the reaction chamber including:

a barrier wall segmenting the reaction chamber into a reduction zone differentiated from a preheat zone; and one or more over-bed air and/or oxygen ports above the reducing bed in the reduction zone, but not in the preheat zone;

delivering over-bed air and/or oxygen to the reduction zone through the one or more ports, but not delivering over-bed air and not delivering over-bed oxygen to the preheat zone;

the feed agglomerates including a core initially containing an oxidizing agent and a reducing agent;

continuously moving the reducing bed through the reaction chamber with the feed agglomerates substantially stable while in the reducing bed;

maintaining a temperature in the reduction zone along at least a portion of the reducing bed partly by adding heat from a direct or indirect first heat source;

maintaining the temperature in the preheat zone by adding heat from an indirect third heat source;

generating gaseous products that enter a freeboard over the reducing bed from a reduction-oxidation reaction occurring in the reducing bed, the gaseous products containing a reduction product from reduction of the oxidizing agent and an incompletely oxidized oxidation product from oxidation of the reducing agent;

exothermically oxidizing the reduction product in the freeboard while still in the reduction zone and exothermically further oxidizing the incompletely oxidized oxidation product in the freeboard while still in the reduction zone, thereby adding heat to the reducing bed from the freeboard as a direct second heat source to reach the temperature in the reduction zone;

collecting oxidized reduction product and/or remaining, unoxidized reduction product, if any, from an off gas from the reaction chamber; and removing from the reaction chamber a residue containing processed agglomerates.

2. The method of claim 1, wherein the reducing bed is formed on a rotating hearth-like bed floor in the reaction chamber.

3. The method of claim 1, wherein the feed agglomerates further include a protective coating on the core, the coating containing carbonaceous material particles.

4. The method of claim 1, wherein the reducing agent is carbon, the reduction-oxidation reaction is a carbo-thermal reduction reaction, the incompletely oxidized oxidation product is carbon monoxide, and the carbon monoxide is exothermically further oxidized to form carbon dioxide.

5. The method of claim 4, wherein the oxidizing agent is phosphate comprised by phosphate ore, the reduction product is phosphorus, and the phosphorus in the reaction chamber is exothermically oxidized to form phosphorus pentoxide.

6. The method of claim 5, wherein the core initially provides a formula weight ratio of silicon dioxide to calcium oxide plus magnesium oxide higher than 1.6.

7. The method of claim 5, wherein the heating of the feed agglomerates comprises heating the feed agglomerates at the reaction chamber temperature, the heating occurring under a reducing freeboard at least until after a carbo-thermal reduction reaction begins, which forms the reducing bed.

8. The method of claim 5, wherein the core initially provides a phosphate content of greater than 13 weight % calculated as $P_2O_5$.

9. The method of claim 5, wherein the temperature in the reaction chamber along at least the portion of the reducing bed ranges from 1250 to 1380° C. without exceeding 1380° C. in all of the reaction chamber.

10. The method of claim 9, wherein, for any reaction chamber temperatures exceeding 1180° C., the reducing bed is exposed to such temperatures for less than 60 minutes.

11. The method of claim 9, wherein the feed agglomerates are heated for 30 minutes to less than 60 minutes at the reaction chamber temperature.

12. The method of claim 9, further comprising melting at least a portion of the core in at least some of the agglomerates heated at the reaction chamber temperature.

13. The method of claim 9, wherein the temperature in all of the reaction chamber ranges from 1250 to 1380° C.

14. The method of claim 13, wherein the reaction chamber occupies the entirety of a space bounded by a roof, an inner sidewall, an outer sidewall, and a floor of a rotary hearth furnace.

15. The method of claim 14, wherein the reaction chamber is annular.

16. The method of claim 9, wherein the core initially provides a formula weight ratio of silicon dioxide to calcium oxide plus magnesium oxide ranging from 0.3 to 0.7.

17. The method of claim 16, wherein less than 20% of the phosphate initially in the feed agglomerates remains in the residue.

18. The method of claim 16, wherein the phosphate ore contains silicon dioxide and the core initially does not contain supplemental silicon dioxide in addition to the silicon dioxide in the phosphate ore.

19. The method of claim 16, wherein the processed agglomerates contain phosphate ore residue and calcium silicate and exhibit pozzolanic properties suitable for supplementary cementitious material at least when ground to a particle size of approximately 45 micrometers.

20. A method for producing a reduction product comprising:

forming a reducing bed containing feed agglomerates in a reaction chamber by heating the feed agglomerates, the reaction chamber including:

a barrier wall segmenting the reaction chamber into a reduction zone differentiated from a preheat zone;

a bed floor at a bottom of the reaction chamber;

one or more direct-fired burners in the reduction zone, but not in the preheat zone;

one or more over-bed air and/or oxygen ports above the bed floor in the reduction zone, but not in the preheat zone; and one or more indirect heating sources in the preheat zone;

the feed agglomerates including a core initially containing an oxidizing agent and a reducing agent;

continuously moving the reducing bed on the bed floor through the reaction chamber from the preheat zone to the reduction zone with the feed agglomerates substantially stable on the bed floor while in the reducing bed and at least while in the reduction zone;

maintaining a temperature in the reduction zone along at least a portion of the reducing bed partly by adding heat from the one or more direct-fired burners;

maintaining the temperature in the preheat zone by adding heat from the one or more indirect heating sources;

generating gaseous products that enter a freeboard over the reducing bed from a reduction-oxidation reaction occurring in the reducing bed, the gaseous products containing a reduction product from reduction of the oxidizing agent and an incompletely oxidized oxidation product from oxidation of the reducing agent;

exothermically oxidizing the reduction product in the freeboard while still in the reduction zone and exothermically further oxidizing the incompletely oxidized oxidation product in the freeboard while still in the reduction zone, thereby adding heat to the reducing bed from the freeboard as a direct second heat source to reach the temperature in the reduction zone;

collecting oxidized reduction product and/or remaining, unoxidized reduction product, if any, from an off gas from the reaction chamber; and removing from the reaction chamber a residue containing processed agglomerates.

21. The method of claim 20, further comprising maintaining a reducing freeboard in the preheat zone during a carbo-thermal reduction reaction among feed agglomerates on the bed floor.

22. The method of claim 20, wherein the bed floor is a rotating bed floor.

23. The method of claim 20, wherein the one or more indirect heating sources comprise electric heating elements and/or radiant tube burners.

24. The method of claim 20, wherein:

the reaction chamber further comprises a second barrier wall further segmenting the reaction chamber into a cooling zone differentiated from the reduction zone; and the method further comprises continuously moving the bed floor through the reaction chamber from the reduction zone to the cooling zone, the cooling zone lacking the direct-fired burners, the over-bed air and oxygen ports, and the indirect heating sources.

25. The method of claim 24, wherein:

the bed floor is a rotating bed floor and the reaction chamber further comprises a third barrier wall further segmenting the reaction chamber and differentiating the cooling zone from the preheat zone; and the method further comprises continuously moving the bed floor through the reaction chamber from the cooling zone to the preheat zone.

26. The method of claim 1, wherein the oxidizing agent is not a metal oxide.

* * * * *